United States Patent
Tezuka et al.

(10) Patent No.: US 12,198,176 B2
(45) Date of Patent: Jan. 14, 2025

(54) REPLACEMENT CANDIDATE RECOMMENDATION SYSTEM AND METHOD

(71) Applicant: Hitachi, Ltd., Tokyo (JP)

(72) Inventors: Shin Tezuka, Tokyo (JP); Satoru Moriya, Tokyo (JP); Takaya Ide, Tokyo (JP); Keisuke Hatasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 387 days.

(21) Appl. No.: 17/641,582

(22) PCT Filed: Jan. 15, 2021

(86) PCT No.: PCT/JP2021/001259
§ 371 (c)(1),
(2) Date: Mar. 9, 2022

(87) PCT Pub. No.: WO2021/157321
PCT Pub. Date: Aug. 12, 2021

(65) Prior Publication Data
US 2022/0301034 A1   Sep. 22, 2022

(30) Foreign Application Priority Data

Feb. 7, 2020  (JP) ................................. 2020-020123

(51) Int. Cl.
*G06Q 30/00* (2023.01)
*G06Q 30/0601* (2023.01)

(52) U.S. Cl.
CPC ............................... *G06Q 30/0631* (2013.01)

(58) Field of Classification Search
CPC .............................................. G06Q 30/06–08
See application file for complete search history.

(56) References Cited

U.S. PATENT DOCUMENTS

2004/0205397 A1* 10/2004 Rajiv .................... G05B 17/02
714/25
2009/0089023 A1*  4/2009 Watanabe ............. G06Q 10/04
703/2

(Continued)

FOREIGN PATENT DOCUMENTS

JP  2009-116401 A  5/2009
JP  2010-160758 A  7/2010

(Continued)

OTHER PUBLICATIONS

Machine translation of WO 2009/069474 A1 ("NEC Corp") downloaded from Espacenet.com (Year: 2009).*

(Continued)

*Primary Examiner* — Ethan D Civan
(74) *Attorney, Agent, or Firm* — Volpe Koenig

(57) ABSTRACT

Regarding MS information, information about each of a plurality of MS's includes meta information of the relevant MS. Regarding model information, information about each of one or a plurality of models includes meta information of the relevant model. A system evaluates appropriateness of an evaluation destination MS/model for an evaluation source MS/model as a replacement MS/model for the evaluation source MS/model on the basis of the meta information of the evaluation destination MS/model and the meta information of the evaluation source MS/model. The system recommends one or more evaluation destination MS's/models, as a candidate for a replacement MS/model of a designated MS/model, to a user on the basis of evaluation of each of one or two or more evaluation destination MS's/models regarding which the MS/model designated by the user in an application configured from one or two or more MS's/models is the evaluation source MS/model.

13 Claims, 19 Drawing Sheets

(56) References Cited

U.S. PATENT DOCUMENTS

| | | |
|---|---|---|
| 2009/0116693 A1 | 5/2009 | Yamamoto et al. |
| 2010/0177957 A1 | 7/2010 | Ogawa |
| 2013/0156303 A1 | 6/2013 | Yamamoto et al. |
| 2014/0214833 A1* | 7/2014 | Ozonat .............. G06F 16/355 707/737 |
| 2020/0293434 A1 | 9/2020 | Masuda et al. |

FOREIGN PATENT DOCUMENTS

| | | |
|---|---|---|
| WO | 2009/069474 A1 | 6/2009 |
| WO | 2017/199517 A1 | 11/2017 |

OTHER PUBLICATIONS

International Search Report, PCT/JP2021/001259, Mar. 9, 2021, 2 pgs.

Building microservices on Azure to support use cases in Machine Learning, Jun. 16, 2019, https://medium.com/kishan19/building-a-machine-learning-based-microservice-bc1b2c00308b [retrieved on Feb. 25, 2021].

Machine Learning for Cloud-Native Applications: "Model Serving as a Service," Aug. 7, 2019, https://www.lightbend.com/blog/machine-learning-for-cloud-native-applications-model-serving-as-a-service [retrieved on Feb. 25, 2021].

\* cited by examiner

| Application ID T1010 | Version T1020 | Application Name T1030 | Application Definition T1040 | User ID T1050 |
|---|---|---|---|---|
| 1 | 1.0 | Motor Failure Predictor Diagnosis | {<br>flows: [<br>  {<br>    name: "Motor Failure Predictor Diagnosis",<br>    nodes: [<br>    ...<br>    {<br>      name: "Motor Failure Predictor Diagnosis",<br>      microservice_id: 1,<br>      out: [<br>        [2]<br>      ],<br>      property: {<br>        ver: 1.0,<br>        model: {<br>          name: "Motor Failure Predictor Diagnosis Model",<br>          id: 1,<br>          ver: 1.0<br>        }<br>        ...<br>      },<br>    },<br>    ...<br>    ]<br>  }<br>} | 1 |
| 2 | 1.1 | Motor Failure Predictor Diagnosis | {...} | 2 |
| 3 | 1.0 | Suspicious Object Detection | {...} | 3 |
| ... | ... | ... | ... | ... |

FIG. 4A

| | T2000 | T2010 | T2020 | T2030 | T2040 | T2050 | | |
| --- | --- | --- | --- | --- | --- | --- | --- | --- |
| | | | | | | Meta Information | | |
| | MS ID | MS Name | Version | Outline | C-LV1 | C-LV2 | C-LV3 |
| | 1 | Motor Failure Predictor Diagnosis | 1.0 | It is a model for diagnosing a predictor for a motor failure... | Industry | Motor | Failure Predictor Diagnosis |
| | 2 | Motor Failure Predictor Diagnosis | 1.1 | It is a model for diagnosing a predictor for a motor failure... | Industry | Motor | Failure Predictor Diagnosis |
| | ... | ... | ... | ... | ... | ... | ... |

| Developer ID | Meta Information | | | Image | MS Program | ... |
|---|---|---|---|---|---|---|
| | API Specifications | Default Model ID | Expected Model Specifications | | | |
| 1 | swagger: "2.0"<br>info:<br>  description: "API of a model for diagnosing a motor failure predictor"<br>  version: "1.0"<br>  ...<br>paths:<br>  /predict<br>    post:<br>      summary: "Estimate probability of various types of failures with respect to chronological vibration data"<br>      parameters:<br>        - name: "data"<br>          in: "body"<br>          required: true<br>          type: "array"<br>          format: "float"<br>      ...<br>      responses:<br>        200:<br>          description: "Response upon success<br>          ... | 1 | Format: h5<br>Dimensionality: 3<br>Input Dimension 1: Chronological Bearing Vibration Data<br>Input Dimension 2: Chronological Coil Vibration Data<br>Input Dimension 3: | https://xxx/yyy.png | /ms/1/1 | ... |
| 1 | {...} | 2 | Format: h5<br>Dimensionality: 3<br>Input Dimension 1: Chronological Bearing Vibration Data<br>... | https://xxx/yyy.png | /ms/1/2 | ... |
| ... | ... | ... | ... | ... | ... | ... |

| T3000 | T3010 | T3020 | T3030 | T3040 | T3050 |
| --- | --- | --- | --- | --- | --- |

| Model ID | Model Name | Version | Outline | Meta Information | | |
| --- | --- | --- | --- | --- | --- | --- |
| | | | | C-LV1 | C-LV2 | C-LV3 |
| 1 | Motor Failure Predictor Diagnosis | 1.0 | It is a model for diagnosing a predictor for a motor failure... | Industry | Motor | Failure Predictor Diagnosis |
| 2 | Motor Failure Predictor Diagnosis | 1.1 | It is a model for diagnosing a predictor for a motor failure... | Industry | Motor | Failure Predictor Diagnosis |
| ... | ... | ... | ... | ... | ... | ... |

| Meta Information | | | | | Image | Model File | ... |
|---|---|---|---|---|---|---|---|
| Developer ID | Importance Focus Label | Importance Focus Index | Index | Actual Model Specifications | | | |
| 1 | Bearing Damage | Acc | Acc: 8 F-V: 5 ... | Format: H5 Dimensionality: 3 Input Dimension 1: Chronological Bearing Vibration Data Input Dimension 2: Chronological Coil Vibration Data Input Dimension 3: ... | https://xxx/ yyy.png | /model/1/1 | ... |
| 1 | Coil Damage | Acc | Acc:9 F-V:5 ... | Format: H5 Dimensionality: 3 Input Dimension 1: Chronological Bearing Vibration Data Input Dimension 2: Chronological Coil Vibration Data Input Dimension 3: ... | https://xxx/ yyy.png | /model/1/2 | ... |
| ... | ... | ... | ... | ... | ... | ... | ... |

| | Weighting Factor ID (T5000) | Label (T5010) | Weighting Factor (T5020) | Pruning Threshold Value (T5030) | ... (T5040) |
|---|---|---|---|---|---|
| T5500 | 1 | Distance Between C-LV1 | 8 | 6 | ... |
| T5501 | 2 | Distance Between C-LV2 | 4 | 3 | ... |
| T5502 | 3 | Distance Between C-LV3 | 2 | 1 | ... |
| T5503 | 4 | MS API Compatibility | 8 | 6 | ... |
| T5504 | 5 | Model Specifications Compatibility | 8 | 6 | ... |
| T5505 | 6 | Developer Relevance | 2 | 1 | ... |
| T5506 | 7 | Distance from Version Parent, Etc. | 2 | 1 | ... |
| T5507 | 9 | Importance Degree Label Appropriateness | 6 | 4 | ... |
| T5508 | 10 | Importance Focus Index Appropriateness | 6 | 4 | ... |
| T5509 | 12 | Index Improvement Degree | 4 | 2 | ... |
| T5510 | 13 | MS/Model Appropriateness | 8 | 6 | ... |
| | ... | ... | ... | ... | ... |

FIG. 8

| Data Set ID | User ID | Application ID | MS ID | Model ID | Dataset Storage Location | Test Program | ... |
|---|---|---|---|---|---|---|---|
| 1 | 1 | 1 | 1 | 1 | /data/1/1/1 | /test_program/1/1/1/test.py | ... |
| 2 | 1 | 2 | 2 | 2 | /data/1/2/2 | /test_program/1/2/2/test.py | ... |
| 3 | 2 | 1 | 1 | 1 | /data/2/1/1 | /test_program/2/1/1/test.py | ... |
| 4 | 2 | 2 | 2 | 2 | /data/2/2/2 | /test_program/2/2/2/test.py | ... |
| ... | ... | ... | ... | ... | ... | ... | ... |

| Evaluation Result ID | Evaluation Source ID | Evaluation Destination ID | FB Evaluated Value | Evaluation Reason | User ID | Time Stamp | Reflected Flag | ... |
|---|---|---|---|---|---|---|---|---|
| 1 | 1:1 | 1:2 | 5 | New and old MS/models are compatible with each other and their performance is significantly good | 1 | 2019/05/30 15:34:09 | True | ... |
| 2 | 1:2 | 1:1 | 4 | New and old MS/models are compatible with each other and their performance is good | 2 | 2019/06/01 10:11:45 | True | ... |
| 3 | 1:2 | 1:3 | 1 | New MS and old MS are not compatible with each other in API index | 2 | 2019/06/02 11:20:31 | False | ... |
| 4 | 2:1 | 2 | 2 | New and old models have different properties | 1 | 2019/06/03 13:45:22 | False | ... |
| ... | ... | ... | ... | ... | ... | ... | ... | ... |

T7000  T7010  T7020  T7030  T7040  T7050  T7060  T7070  T7080 ically accurate model without false judgment. So, the model developer may improve a model which has been registered in the marketplace once, in order to enhance the quality of the model.

REPLACEMENT CANDIDATE RECOMMENDATION SYSTEM AND METHOD

TECHNICAL FIELD

The present invention generally relates to a computer technology for recommending a replacement candidate(s).

BACKGROUND ART

There has been an increase in a case of developing an application(s) by combining a plurality of services called microservices (hereinafter referred to as MS(s)) (services with a few functions). Among the MS's, attention has been focused on those including or utilizing a model(s) developed by a machine learning technology. Possible examples of the model include a model for recognizing a predictor of a machine failure, a model for predicting a failure occurrence time, or a model for judging an object captured in an image by a camera. Both the MS and the model or either one of them will be referred to as the "MS/model(s)."

There may be a case where such MS/models are integrally managed, sold, or operated in a marketplace.

Since the machine learning is usually performed by using limited data possessed by a model developer in advance, it is difficult to develop a completely accurate model without false judgment. So, the model developer may improve a model which has been registered in the marketplace once, in order to enhance the quality of the model.

On the other hand, the MS registered in the marketplace may be updated by the MS developer for the purpose of, for example, speed-up of processing and the updated MS may be newly registered in the marketplace.

The application developer may develop an initial application by combining a plurality of MS/models registered in the marketplace. Subsequently, the application developer may examine a new MS/model (for example, an MS/model after changing a version of the designated MS/model or a new MS/model which does not depend on the designated MS/model) as a replacement for the MS/model designated by the application developer in the relevant application in order to make the application better.

PTL 1 discloses a technology that selectively implements a program test.

CITATION LIST

Patent Literature

PTL 1: WO2017/199517

SUMMARY OF THE INVENTION

Problems to be Solved by the Invention

It is difficult to select a replacement MS/model from an enormous number of MS/models registered in the marketplace. An MS/model designated in the application is replaced with the replacement MS/model for the purpose of enhancing the application (for example, to enhance the performance or quality of the application), but it is difficult for the application developer to judge which MS/model is appropriate as the replacement MS/model.

For example, let us assume a case where the application developer requests Model A to recognize a predictor for a failure of a certain motor and find probability of occurrence of bearing damage in a few days from input fluctuations of the number of rotations of the motor and vibration data of the bearing. The application developer searches for a combination of an MS and Model A for diagnosing a failure predictor of the motor and constructs an initial application. Let us assume that the application developer wants a model with higher short-term prediction accuracy than that of Model A. Let us assume that a new Model B which the model developer insists that it has higher prediction accuracy is newly registered in the marketplace. In this case, the application developer examines the new model B as a replacement for Model A in the initial version of the application. However, there may be a case where the application developer demands the model with high short-term prediction accuracy, while the new Model B is specialized in long-term prediction accuracy and its short-term prediction accuracy is low.

Accordingly, there is a case where indexes on which the model developer and the application developer focus their attention are different and, as a result, the new model which has been improved by paying attention only to the index focused by the model developer cannot obtain the result expected by the application developer.

Such a problem could occur similarly to the MS.

One possible method for solving the above-described problem is a method performed by the application developer to implement a test to see whether or not the MS/model to be improved satisfies requirements desired by the application developer.

However, the application developer suffers heavy load to implement the test (for example, collecting a necessary dataset, labeling correct answers to the dataset, or developing a test program).

PTL 1 discloses the technique for selectively implementing a test of a program, but there still remains the problem of the heavy load on the application developer. For example, the dataset of a necessary and sufficient amount and quality for the test cannot be always prepared. Specifically speaking, for example, test data which the model developer has used to evaluate the model may be used by the application developer, but the dataset is information which is highly valuable for the model developer, and there may a case where it is difficult to disclose such a dataset to the application developer.

Means to Solve the Problems

There are MS information and model information. Regarding the MS information with respect to each of one or a plurality of MS's, the information includes meta information of the MS. Regarding the model information with respect to each of one or a plurality of models, the information includes meta information of the model. A system refers to at least one of the MS information and the model information and, regarding each of one or two or more evaluation destination MS's/models for the relevant evaluation source MS/model with respect to each of one or two or more evaluation source MS's/models, evaluates appropriateness as a replacement MS/model for the evaluation source MS/model on the basis of the meta information of the evaluation destination MS/model and the meta information of the evaluation source MS/model. The MS/model is both the micro MS and the model or either one of them. Regarding each of one or two or more evaluation source MS's/models, one or two or more evaluation destination MS's/models for the relevant evaluation source MS/model is/are all or some MS's/models other than the evaluation source MS/model. The system recommends, to the user, one or more evaluation destination MS's/models as a replacement MS/model candidate for a designated MS/model on the basis of the evaluation of each of the one or two or more evaluation destination MS's/models regarding which the MS/model designated by the user in an application configured from one or two or more MS's/models is the evaluation source MS/model.

Advantageous Effects of the Invention

According to the present invention, it is possible to recommend an MS/model candidate as a replacement for the designated MS/model to the user.

BRIEF DESCRIPTION OF DRAWINGS

FIG. 3 is a diagram illustrating a configuration example of an application table;

FIG. 4A is a diagram illustrating part of a configuration example of an MS table;

FIG. 4B is a diagram illustrating the remaining part of the configuration example of the MS table;

FIG. 5A is a diagram illustrating part of a configuration example of a model table;

FIG. 5B is a diagram illustrating the remaining part of the configuration example of the model table;

FIG. 7 is a diagram illustrating a configuration example of a weighting factor table;

FIG. 8 is a diagram illustrating a configuration example of a dataset table;

FIG. 9 is a diagram illustrating a configuration example of a feedback table;

DESCRIPTION OF EMBODIMENTS

Figure 1:
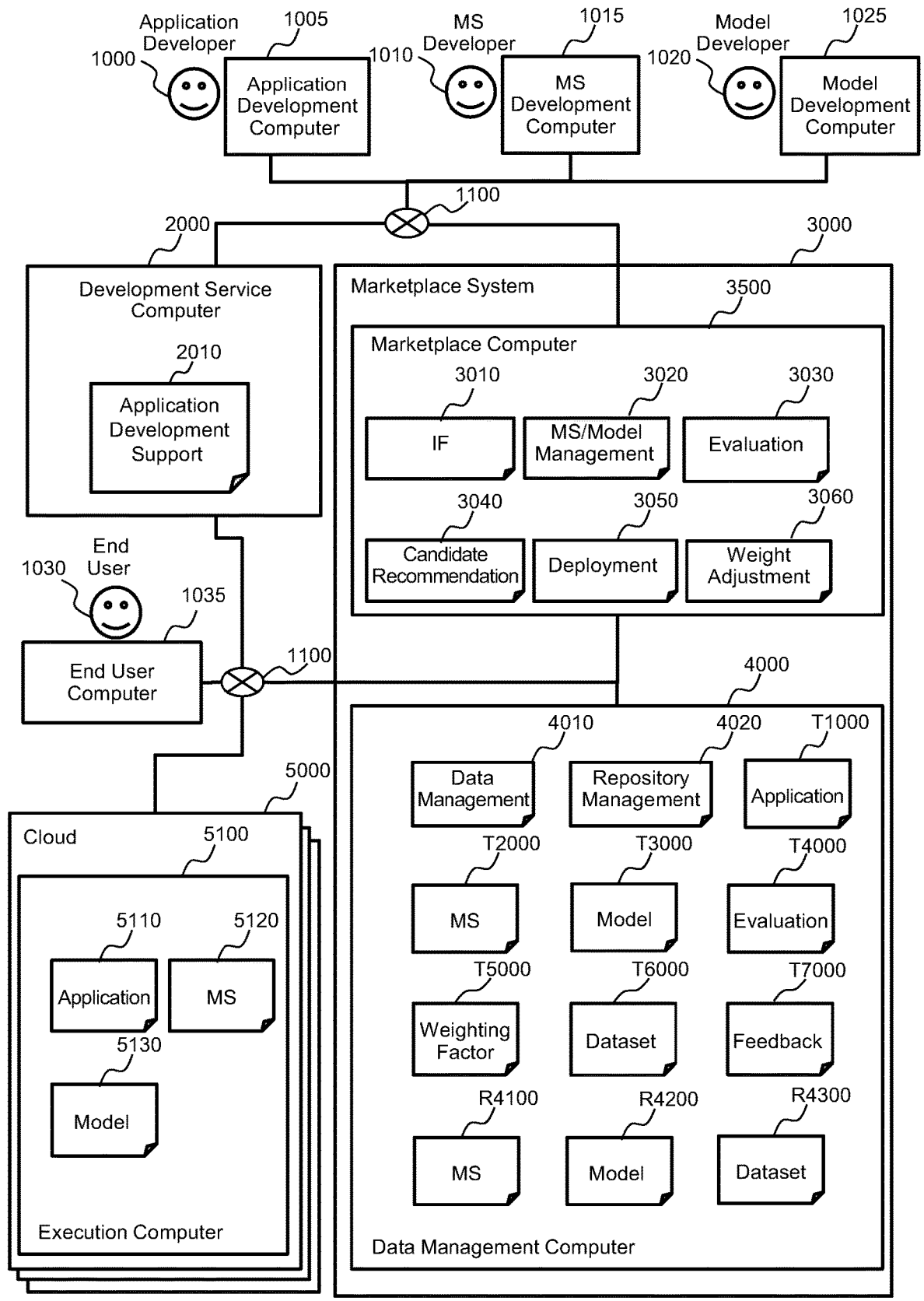
FIG. 1 is a diagram illustrating a configuration example of the entire system according to an embodiment of the present invention.

In the description indicated below, an "interface apparatus" may be one or more interface devices. The one or more interface devices may be at least one of the following:

One or more I/O (Input/Output) interface devices. The I/O (Input/Output) interface device is an interface device for at least one of an I/O device and a remote display computer. The I/O interface device for the display computer may be a communication interface device. At least one I/O device may be a user interface device, for example, either one of input devices such as a keyboard and a pointing device, and output devices such as a display device.

One or more communication interface devices. The one or more communication interface devices may be one or more communication interface devices of the same type (for example, one or more NICs [Network Interface Cards]) or two or more communication interface devices of different types (for example, an NIC and an HBA [Host Bus Adapter]).

Furthermore, in the description indicated below, a "memory" is one or more memory devices and may typically be a main storage device. At least one memory device in the memory may be a volatile memory device or a nonvolatile memory device.

Furthermore, in the description indicated below, a "persistent storage apparatus" is one or more persistent storage devices. The persistent storage device is typically a nonvolatile storage device (such as an auxiliary storage device) and is specifically, for example, an HDD (Hard Disk Drive) or SSD (Solid State Drive).

Furthermore, in the description indicated below, a "storage device" may be a memory and at least a memory for the persistent storage apparatus.

Furthermore, in the description indicated below, a "processor" is one or more processor devices. At least one processor device is typically a microprocessor device like a CPU (Central Processing Unit), but may be a processor device of a different type like a GPU (Graphics Processing Unit). At least one processor device may be of a single-core type or a multi-core type. At least one processor device may be a processor core. At least one processor device may be a processor device in a broad sense such as a hardware circuit which performs a part or whole of processing (such as an FPGA [Field-Programmable Gate Array] or an ASIC [Application Specific Integrated Circuit]).

Furthermore, in the description indicated below, information which is obtained as output in response to input may be sometimes described by an expression like "aaa table"; however, such information may be data of whatever structure. Therefore, the "aaa table" can be expressed as "aaa information." Furthermore, in the following description, the structure of each table is one example and one table may be divided into two or more tables or all or some of two or more tables may be one table.

Furthermore, in the description indicated below, a function may be sometimes described by an expression like "bbb unit"; however, the function may be implemented by execution of one or more computer programs by a processor or may be implemented by one or more hardware circuits (such as FPGA or ASIC). If the function is implemented by the execution of a program by the processor, specified processing is performed by using, for example, storage devices and/or interface devices as appropriate and, therefore, the function may be considered as at least part of the processor. The processing explained by referring to the function as a subject may be the processing executed by the processor or an apparatus which has that processor. The program may be installed from a program source. The program source may be, for example, a program distribution computer or a computer-readable recording medium (such as a non-transitory recording medium). An explanation of each function is one example and a plurality of functions may be gathered as one function or one function may be divided into a plurality of functions.

Furthermore, in the description indicated below, processing may be sometimes described by referring to a "program"

as a subject; however, the program is executed by a processor and thereby performs defined processing by using a storage apparatus and/or an interface apparatus as appropriate, so that the subject of the processing may be the processor (or a device like a controller having that processor). The program may be installed from a program source into a device like a computer. The program source may be, for example, a program distribution server or a computer-readable recording medium (such as a non-transitory recording medium). Furthermore, in the following description, two or more programs may be implemented as one program or one program may be implemented as two or more programs.

Furthermore, in the description indicated below, a "replacement candidate recommendation system" may be configured from one or more computers or may be implemented in a resource pool including a plurality of calculation resources (for example, a cloud platform). For example, when a computer has a display device and displays information on its display device, the computer may be the replacement candidate recommendation system. To "display information" may mean to display the information on a display device which the replacement candidate recommendation system has, or for the replacement candidate recommendation system to transmit the information to a remote display computer (in the latter case, the relevant information is displayed by the display computer).

One embodiment of the present invention will be explained below with reference to the drawings. Incidentally, the embodiment and the drawings indicated below are one of aspects for implementing the present invention and application to other configurations or aspects which are capable of similar processing is not restricted.

FIG. 1 illustrates a configuration example of the entire system according to an embodiment of the present invention.

In this embodiment, at least part of a marketplace system 3000 (for example, a marketplace computer 3500 including an evaluation program 3030 and a candidate recommendation program 3040) is one example of a replacement candidate recommendation system. For example, an application which diagnoses a failure predictor of bearing damage of a certain motor is developed or operated by an application developer 1000. In that process, the marketplace computer 3500 recommends an MS/model which has a highly possibility to replace an MS/model included in the relevant application (for example, the possibility to contribute to enhancement of quality of the relevant application), among new MS's/models which are added or updated every moment, to an application developer 1000.

The application evokes a model developed by a model developer 1020 by using an Application Programming Interface (API) or the like and performs a diagnosis. On the other hand, an MS developer 1010 who developed an MS and the model developer 1020 who developed the model consider maximization of an average value of prediction accuracy of a plurality of types of failure predictor diagnoses as an important index and update the MS and the model, respectively.

As a comparative example, the application developer needs to firstly perform work to find an MS/model which satisfies requirements for the application, from among an enormous number of MS's/models which are registered in a marketplace. In addition, an index on which the application developer focuses importance and an index on which the model developer focuses importance are different from each other, so that the model of a certain version can obtain the result expected by the application developer, but a new model with the index to which the model developer focuses attention may not necessarily obtain the result expected by the application developer. Furthermore, in order for the MS developer to be capable of diagnosing a plurality of types of failures, there is a possibility that the operation is not what is expected by the application, for example, to change API response specifications. Therefore, the application developer needs to prepare test data which satisfies the requirements for the application, and perform a test every time.

In this embodiment, for example, the marketplace computer 3500 evaluates whether an MS/model registered in the marketplace system 3000 (for example, a pair of an MS and a model) can replace an MS/model in the application (for example, a pair of an MS and a model in the application) or not by comparing mutual meta information of the MS's/models. The marketplace computer 3500 presents a replacement candidate for the MS/model which is used in the present application on a screen displayed on an application development computer 1005 (for example, a screen for the marketplace or an editor screen which uses the application for development) on the basis of the result of the above-described evaluation.

A system according to this embodiment includes: one or a plurality of development service computers 2000 which provides services used by one or a plurality of application developers 1000 when developing an application(s); a marketplace system 3000 which manages one or a plurality of MS's and one or a plurality of models; and one or a plurality of clouds 5000 including one or a plurality of execution computers 5100 which operates a developed application 5110, one or a plurality of MS's 5120 which constitute the application 5110, and one or a plurality of models 5130 used by the MS(s) 5102. In the following explanation, regarding various constituent elements of the system, the number of each of the constituent elements is "one or a plurality of"; however, the constituent element will be treated as singular in order to simply the explanation as necessary. Moreover, each computer which will be explained below has an interface device, a storage apparatus, and a processor connected to them. Each computer performs communications via the interface device. In each computer, the storage apparatus stores programs and information (for example, tables and files). The processor in each computer executes the programs.

The development service computer 2000 includes an application development support program 2010 which provides a development service for supporting the development of applications. The relevant program 2010 is executed by the relevant computer 2000.

The marketplace system 3000 includes the marketplace computer 3500 and a data management computer 4000 including data used by the marketplace computer 3500.

The marketplace computer 3500 includes: an MS/model management program 3020 which accepts registration of an MS(s) by the MS developer 1010 from an MS development computer 1015, accepts registration of a model(s) by a model developer 1020 from a model development computer 1025, and provides the registered MS/model to an application developer 1000; an evaluation program 3030 which evaluates an MS/model which is a replacement candidate; a candidate recommendation program 3040 which presents the replacement candidate to the application developer 1000; a deployment program 3050 which deploys an application to a cloud 500; and an I/F (Interface) program 3010 receives instructions for registration, search, and presentation or deployment of the replacement candidate. These programs 3010, 3020, 3030, 3040, 3050, and 3060 are executed by the relevant computer 3500.

One or a plurality of MS developers 1010 access the I/F program 3010 via one or a plurality of MS development computers 1015 and registers an MS(s). One or a plurality of model developers 1020 access the I/F program 3010 via one or a plurality of model development computers 1025 and registers a model(s).

One or a plurality of application developers 1000 develop an application(s) by using development services via one or a plurality of application development computers 1005. The application includes one or a plurality of MS's/models. The MS(s)/model(s) included in the application are searched by the marketplace computer 3500 via the I/F program 3010 and are incorporated into the application. There is an MS including a model and there is an MS which does not include a model, but uses the model.

Incidentally, the application developer 1000, the MS developer 1010, and the model developer 1020 may be humans or programs as long as they can register an MS(s)/model(s) to the development service computer 2000 and the marketplace computer 3500 and request them to, for example, recommend and deploy a replacement candidate. Moreover, the I/F program 3010 may provide a model list screen G1000, a model details screen G2000, a model evaluation setting screen G3000, and a model registration screen G4000 via, for example, a browser included by the application development computer 1005 and the model development computer 1025. Furthermore, a model(s) created by using a known machine learning technique such as an autoregressive moving average model (for example, an ARIMA (Autoregressive Integrated Moving Average) model) and a neural network can be adopted as a model(s).

The data management computer 4000 is a computer for managing data and files which are used by various kinds of programs included by the marketplace computer 3500. The data management computer 4000 includes: a data management program 4010 for managing data; a repository management program 4020 for managing repositories; an application table T1000 for retaining information of developed applications; an MS table T2000 for retaining information of MS's registered in the marketplace; a model table T3000 for retaining information of models registered in the marketplace; an evaluation table T4000 for retaining evaluation information of a pair which is a replacement candidate for a pair of an MS and a model; a weighting factor table T5000 for retaining information of weighting factors of various types of evaluation expressions used when calculating the evaluation information; a feedback table T6000 for retaining feedback information from the application developer 1000 with respect to a recommended replacement candidate; an MS repository R4100 for managing program files or the like which are substances of MS's; a model repository R4200 for managing files or the like of models; and a dataset repository R4300 including test data used when conducting a test of an MS/model, which is recommended as a replacement candidate, from a viewpoint of an application. These programs 4010 and 4020 are executed by the relevant computer 4000.

The transmission, reception, and management of all the data included in the data management computer 4000 are conducted via the data management program 4010. An example of the data management program 4010 is a database management system; however, the data management program 4010 other than the database management system may be adopted as long as it can manage the data and respond to a data transmission/reception request via API. Furthermore, perpetuation of data and files may be implemented by using a relational database or a database such as NoSQL or may be implemented by storing them as files in a file system, or may be implemented by any other methods.

The MS repository R4100 included in the data management computer 4000: is a repository which retains programs which are substances of MS's; and has a function managing the programs for the MS's with respect to each MS and each version.

The model repository R4200: is a repository which manages files of the models; and has a function managing the files or the like for the models with respect to each model and each version.

The dataset repository R4300 is a repository which retains test data used when conducting the test of the MS/model which is recommended as the replacement candidate from the application viewpoint.

Transmission, reception, and management of information managed by the MS repository R4100, the model repository R4200, and the dataset repository R4300 which are included in the data management computer 4000 are managed via the repository management program 4020.

The marketplace system 3000 may include computers other than the marketplace computer 3500, and the data management computer 4000. The marketplace computer 3500 and the data management computer 4000 may include, other than the programs, data, repositories illustrated in FIG. 1, for example, programs for managing the application developer 1000, the MS developer 1010, and the model developer 1020, a user management table for recording the developers' information, programs and data for charging fees for the use of MS's/models and the deployment of applications, and other programs and data.

The execution computer 5100 is a computer for operating an application(s). The execution computer 5100 executes the application 5110 on the relevant computer 5100 in accordance with a deployment instruction from the deployment program 3050. The execution computer 5100 acquires an MS 5120 evoked by the application and a model 5130 evoked by the MS 5120 from the data management computer 4000 and executes them. Incidentally, the end user 1030 who uses the application via the API or the like accesses the application 5110 executed on the execution computer 5100 via the network 1100 by using the end user computer 1035; however, other methods may be adopted as a method for the end user 1030 to access the application.

The respective computers which configure the system illustrated in FIG. 1 are connected via one or a plurality of networks 1100. One example of the network 1100 is the Internet. The network 1100 may be a Virtual Private Network (VPN) or other networks. Incidentally, there may exist any physical equipment and wiring or the like to mutually connect the equipment which is not illustrated in FIG. 1.

Figure 2:
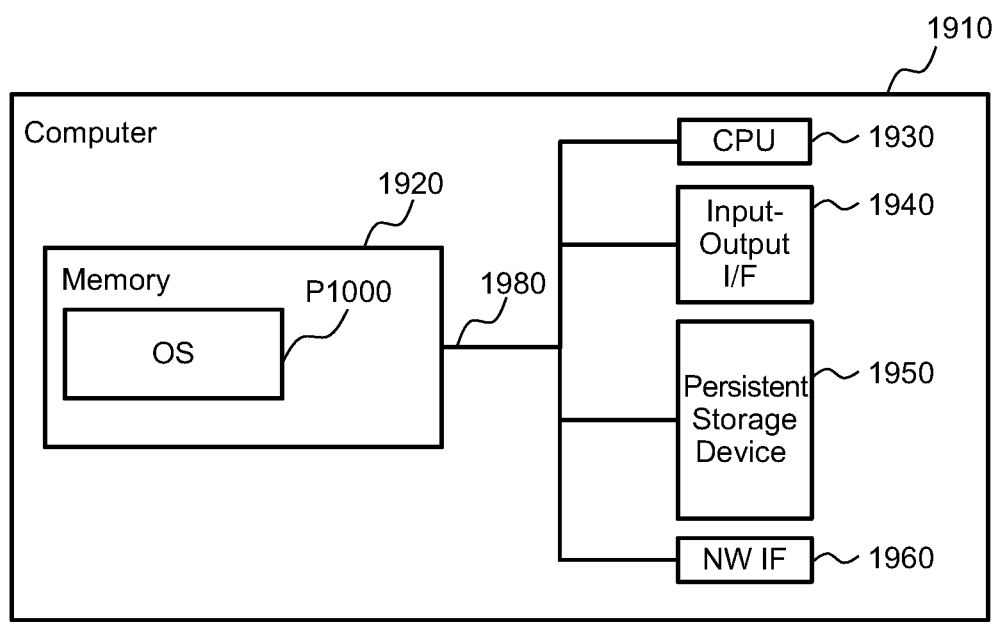
FIG. 2 is a diagram illustrating a configuration example of a computer.

FIG. 2 illustrates an example of elements which are in common with the respective computers possessed by the system illustrated in FIG. 1.

A computer 1910 illustrated in FIG. 2 can correspond to any one of computers in the system illustrated in FIG. 1. The computer 1910 includes a memory 1920, a CPU 1930, an input-output I/F 1940, a persistent storage device 1950, and a NW I/F 1960 and they are connected via an internal bus 1980. The input-output I/F 1940 and the NW I/F 1960 are examples of interface devices. The input-output I/F 1940 is an example of one or a plurality of I/O interface devices. The NW I/F 1960 is an example of one or a plurality of communication interface devices. The memory 1920 and the persistent storage device 1950 are examples of the storage devices. The CPU 1930 is an example of the processor. The processor may include, for example, GPU.

Programs are stored in the persistent storage device 1950, are loaded into the memory 1920, and are executed by the CPU 1930. Incidentally, regarding each of all the computers 1910 possessed by the system according to this embodiment, an Operating System (OS) P1000 is loaded into the memory 1920 and is executed by the CPU 1930.

All the computers may be physical computers or virtual computers which operate on the physical computers. Moreover, regarding at least one computer, the persistent storage device 1950 may not exist, and an external storage apparatus or a storage service for providing a storage space (for example, one of cloud computing services) may be adopted.

An example of the NW I/F 1960 included in each computer is a Network Interface Card (NIC), but may be other than this.

Furthermore, output devices such as a display and input devices such as a keyboard and a mouse may be included as examples of the input-output I/F 1940. If the computer 1910 is remotely managed via the network, the input-output I/F may not exist.

Programs and tables included in each of the above-described computers may be included in the persistent storage device included in each computer. In addition, all the programs are executed by a CPU included by each computer.

Incidentally, all the programs included in the system according to this embodiment may be executed by a plurality of different computers or may be executed by one computer. Moreover, regarding each program, all steps may be executed by one computer and each step may be executed by a different computer.

Furthermore, constituent elements, which are not illustrated in FIG. 2, and wiring or the like to connect the constituent elements may be included in the computer 1910.

FIG. 3 illustrates a configuration example of the application table T1000.

The application table T1000 includes information of applications developed by the application developer 1000. The application table T1000 has records on an application basis. Each record has information of one application and includes, for example, an application identifier T1010, a version T1020, an application name T1030, an application definition T1040, and a user identifier T1050.

The application identifier T1010 is an identifier for uniquely identifying an application in the table and, for example, a value of a serial number or the like is assigned by the data management program 4010.

The version T1010 is information for identifying different versions of the same application. Incidentally, a value of the version T1010 may be expressed with, for example, a numerical value and other values may be used as long as the version of the model can be uniquely identified.

Figure 14:
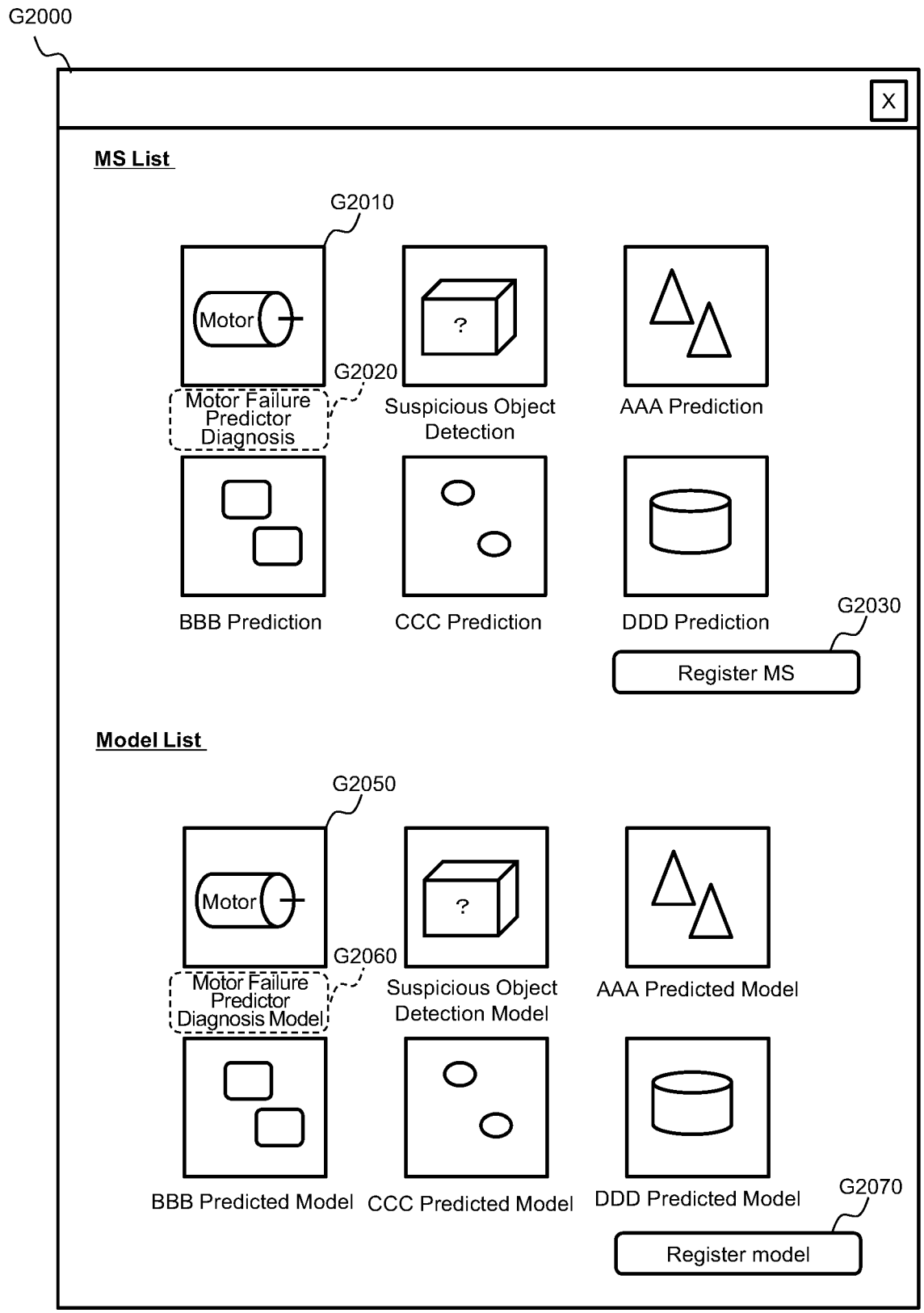
FIG. 14 is a diagram illustrating an implementation example of an MS/model list screen.
Figure 15:
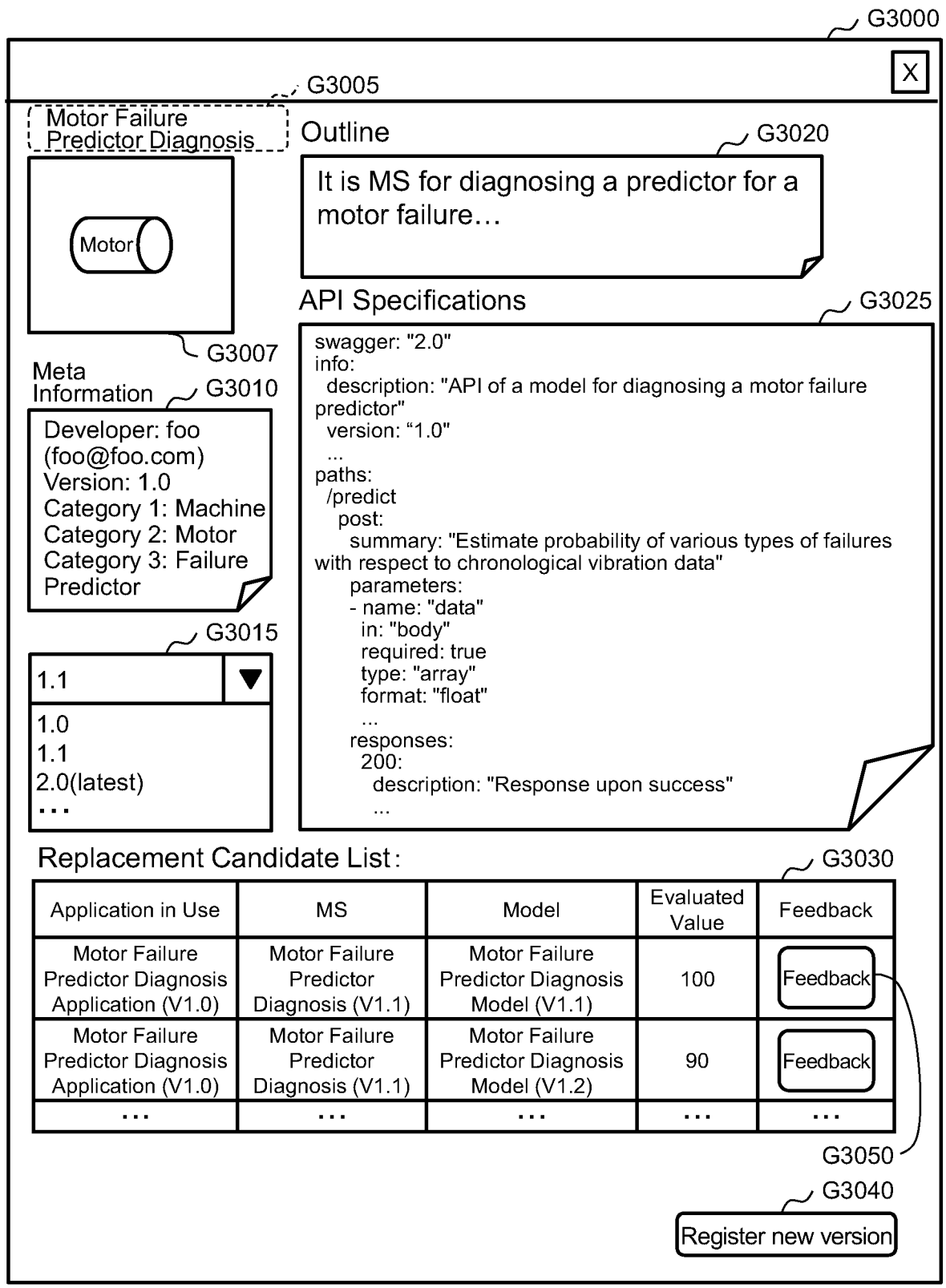
FIG. 15 is a diagram illustrating an implementation example of an MS details screen.

The application name T3010 indicates the name of each application and may include, for example, a character string input by the application developer on the screen G1000 (see FIG. 13) and may be displayed on the MS details screen G2000 (see FIG. 14) or the model details screen G3000 (see FIG. 15).

The application definition T1040 includes information indicating what kinds of MS(s) and model(s) are used to configure the relevant application and how MS's cooperate with each other. For example, if a visual programming tool is used for the application development support program 2010 provided by the development service computer 2000, information indicating how one or a plurality of nodes located in an editor provided by the visual programming tool cooperate with a node(s) may be recorded as the application definition T1040. Specifically speaking, for example, the application may have a DAG (Directed Acyclic Graph) structure in which the MS's/models include an edge representing cooperation between the nodes and the MS's/models.

The user identifier T1050 is an identifier for uniquely identifying the application developer 1000. The user identifier may be included by the data management computer 4000. Moreover, the user identifier may be unique information in a table which retains information of the developer.

FIG. 4A and FIG. 4B indicate configuration examples of the MS table T2000.

The MS table T2000 is a table for managing MS's registered in the marketplace system 3000. The MS table T2000 has records on an MS basis. Each record has information of one MS and includes, for example, an MS identifier T2010, an MS name T2020, a version T2030, an outline T2040, meta information T2050, an image T2060, and an MS program T2070. Registration of an MS in the marketplace system 3000 is implemented by, for example, the MS developer 1010 transmitting the information included in the MS table T2000 to the I/F program 3010 included in the marketplace computer 3500.

The MS identifier T2010 is an identifier for uniquely identifying an MS in the table T2000 and, for example, a value of a serial number or the like is assigned by the data management program 4010.

The version T2030 is information for identifying a version of the relevant MS. Incidentally, the value of the version T2030 may be expressed with, for example, a numerical value and any other values may be used as long as the version of the MS can be uniquely identified.

The outline T2040 is a text for explaining what kind of MS the relevant MS is.

The meta information T2050 includes information indicating classification and input-output specifications, and so on of the relevant MS and includes, for example, a category level 1 T2051 indicating a large category, a category level 2 T2052 indicating a medium category, a category level 3 T2053 indicating a small category, a developer identifier T2054, API specifications T2055, a default model identifier T2056, and expected model specifications T2057. The meta information T2050 may be used to display, for example, the MS details screen G3000 described later or may be used by the evaluation program 3030 to evaluate whether there is an MS which can replace a certain MS or not.

Regarding the meta information T2050, the category levels 1 to 3 mean levels as a detailed degree of the category to which the relevant MS belongs. The category level 1 T2051 indicates the large category like a business type such as an "industry." The category level 2 T2052 indicates the medium category like target equipment such as a "motor." The category level 3 T2053 indicates what kind of processing is to be implemented such as a "failure predictor diagnosis." Incidentally, the number of the category levels may not be limited to the three levels from "1" to "3," but may be less or more than the three levels and a plurality of values such as the "industry" and "agriculture" may be adopted for one category level.

The developer identifier T2054 is a value capable of uniquely identifying the MS developer 1010 who developed the relevant MS.

The API specifications T2055 are information which defines input-output specifications for the relevant MS. That information may be information of whatever format as long as it is information including the API specifications which are input-output information.

The default model identifier T2056 is an identifier for identifying a standard model assumed by the MS developer 100 to be evoked from the relevant MS and used.

The expected model specifications T2057 are information which defines expected specifications for the model to be evoked from the MS and includes at least one of, for example, a file format of the model, the number of dimensions of data to be input/output, and a label (name) of each dimension of the data to be input/output.

The image T2060 is information indicating an image of the relevant MS and may be, for example, information indicating a storage location of an image file (for example, a URL (Uniform Resource Locator) or a path) or may be image data itself.

The MS program T2070 is information indicating a storage location of a program which is a substance of the relevant MS and may be, for example, information indicating a path used when acquiring the program from the MS repository T4100 via the repository management program T4020.

FIG. 5A and FIG. 5B illustrate configuration examples of the model table T3000.

The model table T3000 is a table for managing models registered in the marketplace system 3000. The model table T3000 has records on a model basis. Each record has information of one model and includes, for example, a model identifier T3010, a model name T3020, a version T3030, an outline T3040, meta information T3050, an image T3060, and a model file T3070. Registration of a model in the marketplace system 3000 is implemented by, for example, the model developer 1020 transmitting the information included by the model table T3000 to the UF program 3010 included by the marketplace computer 3500.

The model identifier T3010 is an identifier for uniquely identifying a model in the table T3000 and, for example, a value of a serial number or the like is assigned by the data management program 4010.

The version T3030 is information for identifying a version of the relevant model. Incidentally, the value of the version T3030 may be expressed with, for example, a numerical value and any other values may be used as long as the version of the model can be uniquely identified.

The outline T3040 is a text for explaining what kind of model the relevant model is.

The meta information T3050 includes information indicating classification and input-output specifications, and so on of the relevant model and includes, for example, a category level 1 T2051 indicating a large category, a category level 2 T3052 indicating a medium category, a category level 3 T3053 indicating a small category, a developer identifier T3054, an importance focus label T3055, an importance focus index T3056, an index T3057, and actual model specifications T3058. The meta information T3050 may be used to display, for example, the model details screen G4000 described later or may be used by the evaluation program 3030 to evaluate whether there is a model which can replace a certain model or not.

Regarding the meta information T3050, the category levels 1 to 3 mean levels as a detailed degree of the category to which the relevant model belongs. The category level 1 T3051 indicates the large category like a business type such as an "industry." The category level 2 T3052 indicates the medium category like target equipment such as a "motor." The category level 3 T3053 indicates what kind of processing is to be implemented such as a "failure predictor diagnosis." Incidentally, the number of the category levels may not be limited to the three levels from "1" to "3," but may be less or more than the three levels and a plurality of values such as the "industry" and "agriculture" may be adopted for one category level.

The developer identifier T3054 is a value capable of uniquely identifying the model developer 1020 who developed the relevant model.

The importance focus label T3055 is information indicating on what kind of label the importance was focused when the relevant model was developed. For example, if there are two label types "bearing damage" and "coil damage" as labels in a failure mode which become diagnosis targets for a model regarding which a failure predictor of a motor developed by using the machine learning technique is diagnosed, the importance focus label T3055 indicates on either one of these labels of diagnosis accuracy the importance was focused when developing the model.

The importance focus index T3056 is information indicating on what kind of index the importance was focused when developing the model. The importance focus index T3056 indicates on which index among evaluation indexes such as "Accuracy," "Precision," "F-Value," and "Recall," the importance was focused. For example, concerning the model regarding which the failure predictor of the motor developed by using the machine learning technique is diagnosed, when the importance focus index is "Recall," the model will have few oversight of failures; and in a case of "Precision," the model will focus the importance on how small the number of false failure detections is. Incidentally, the importance focus index may be the value of a description such as "Accuracy" or may be any other information as long as it is information used when evaluating the model.

The index T3057 is information visually indicating what kind of result the relevant model will become with respect to the index such as "Accuracy" and is information including, for example, an index name and a numerical value obtained (calculated) with respect to the relevant index for each index.

The actual model specifications T3058 is information defining actual specifications for the relevant model and includes at least one of, for example, a file format of the model, the number of dimensions of data to be input/output, and a label (name) of each dimension of the data to be input/output.

The image T3060 may be information indicating an image of the relevant model and, for example, information indicating a storage location of an image file (for example, a URL or a path) or may be image data itself.

The model file T3070 may be information indicating a storage location of a file which is a substance of the relevant model and, for example, information indicating a path used when acquiring the file from the model repository T4200 via the repository management program T4020.

Regarding each model, at least part of the meta information T3050 (for example, the importance focus label T3055, the importance focus index T3056, and the index T3057) indicates properties of the relevant model.

Figure 6:
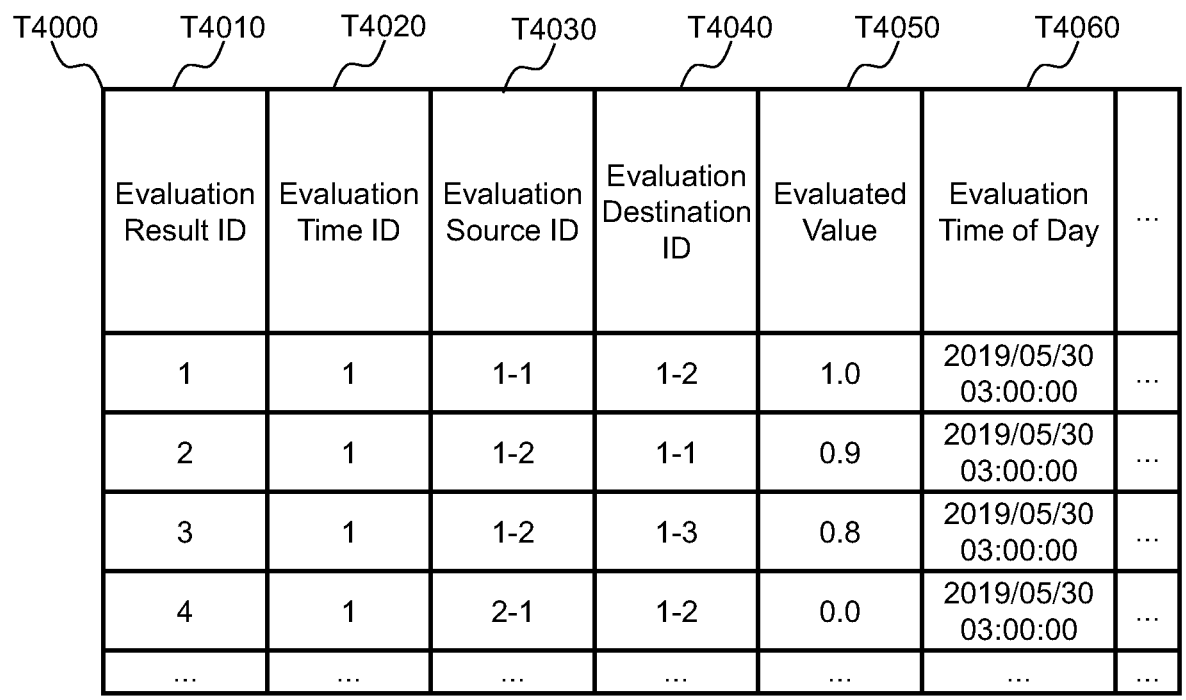
FIG. 6 is a diagram illustrating a configuration example of an evaluation table.

FIG. 6 illustrates a configuration example of the evaluation table T4000.

The evaluation table T4000 is a table for managing the evaluation result of a replacement candidate for a certain MS-model pair (a pair of a certain MS and a certain model) (the evaluation result by the evaluation program 3030. The evaluation table T4000 has records on an evaluation set basis that is a set of an MS-model pair which is an evaluation source, and an MS-model pair which is an evaluation destination. Each record has information of one evaluation set and includes, for example, an evaluation result identifier T4010, an evaluation time identifier T4020, an evaluation source identifier T4030, an evaluation destination identifier T4040, an evaluated value T4050, and an evaluation time of day T4060.

The evaluation result identifier T4010 is an identifier for uniquely identifying information of the evaluation result of the evaluation set in the table T4000 and, for example, a value of a serial number is assigned by the data management program 4010.

The evaluation time identifier T4020 is a value indicating the number of times when the evaluation program 3030 evaluates the relevant replacement candidate with respect to a pair of the MS and the model which are registered in the marketplace system 3000. The value of the number of times may be, for example, a serial number or the time of day may be expressed as a character string and any other information may be used as long as it is information capable of identifying the number of times of the evaluation.

The evaluation source identifier T4030 is an identifier of a MS-model pair which becomes an evaluation source in the evaluation of the replacement candidate for the MS-model pair (for example, an MS-model pair in the application). Moreover, the evaluation destination identifier T4040 is an identifier of an MS-model pair which becomes an evaluation destination in the evaluation of the replacement candidate for the MS-model pair (that is, the MS-model pair which can be the replacement candidate). The identifier may be expressed like "1-1" and "1-2" by connecting the identifier of the MS and the identifier of the model with "—" or any other expressions may be used as long as the relevant expression is in a format capable of uniquely identifying the pair. For example, "1-2" means a pair of the MS with the MS identifier "1" and the model with the model identifier "2." The evaluation source MS-model pair may be hereinafter sometimes abbreviated as the "evaluation source pair" and the evaluation destination MS-model pair may be hereinafter sometimes abbreviated as the "evaluation destination pair."

The evaluated value T4050 is a value indicating a degree of appropriateness of the evaluation destination as a replacement candidate for the evaluation source and is calculated by the evaluation program 3030. Incidentally, the calculated evaluated value may be, for example, a continuous value or a noncontinuous value. In this embodiment, the evaluated value is 0.0 or more and 1.0 or less, but the range of the evaluated value may not be limited to that example.

The evaluation time of day T4060 indicates a time of day when the evaluated value of the evaluation destination for the evaluation source was calculated.

Referring to FIG. 6, in this embodiment, an MS and a model constitute a pair and the evaluation of an evaluation destination pair is conducted (evaluation of appropriateness as a replacement for an evaluation source pair). However, the present invention is not limited to such an evaluation. For example, the evaluation source may be any one of one MS, one the model, and one MS model set and the evaluation destination may be any one of one MS, one model, and one MS model set. An "MS model set" is a set configured from one MS and one or more models and may be, for example, an MS-model pair and an MS-model group configured from one MS and a plurality of models. In this embodiment, it is assumed that each of the evaluation source and the evaluation destination is an MS-model pair in order to simplify the explanation.

FIG. 7 illustrates a configuration example of the weighting factor table T5000.

The weighting factor table T5000 is a table in which data of a weighting factor which can be obtained by an evaluation expression used to evaluate a replacement candidate for a certain MS-model pair is stored. The weighting factor table T5000 has records on a weighting factor basis. Each record has information of one weighting factor and includes, for example, a weighting factor identifier T5010, a label T5020, a weighting factor T5030, and a pruning threshold value T5040.

The weighting factor identifier T5010 is an identifier for uniquely identifying information of the weighting factor in the table T5000 and, for example, a value of a serial number or the like is assigned by the data management program 4010.

The label T5020 is the name of the weighting factor (in other words, the name of the evaluation item) and may be a character string or a numeric value or any other information may be used as long as it is the name of the weighting factor.

The weighting factor T5030 is a value as the weighting factor. The weighting factor T5030: may only have to be a value which can be used when the evaluation program 3030 performs the evaluation; and may be an integer or a real number. In an example of FIG. 7, "8" is a maximum value of the weighting factor (meaning that an element corresponding to the relevant weighting factor is most important) and "2" is a minimum value of the weighting factor (meaning that the element corresponding to the relevant weighting factor is not important).

The pruning threshold value T5040 is a threshold value used for pruning performed when the evaluation program 3030 implements the evaluation. The "pruning" is to decide upon a pruning judgment using a pruning threshold value that the evaluation destination cannot become a replacement for the evaluation source. The "pruning threshold value" is a threshold value for the evaluated value (a value based on the degree of coincidence between the evaluation source and the evaluation destination) calculated for the evaluation item (the weighting factor label). The "pruning judgment" is to judge whether pruning should be performed or not. When according to the pruning judgment regarding a plurality of weighting factors, for example, there is obviously a difference in the API specifications between the MS of the evaluation source and the MS of the evaluation destination (the evaluated value corresponding to the evaluation item "MS API compatibility" is equal to or smaller than the pruning threshold value "6") and it is hard to say that the MS of the evaluation destination can be a replacement, the pruning is decided (it is decided that the evaluation source cannot be replaced with the evaluation destination) even if the appropriateness is high (for example, even if there is no difference) regarding an evaluation item other than the API specifications (for example, the "model specifications compatibility") between the evaluation source and the evaluation destination.

FIG. 8 illustrates a configuration example of the dataset table T6000.

The dataset table T6000 is a table in which information of datasets used to evaluate whether the relevant MS-model pair is appropriate for the application or not is recorded and is registered by the application developer 1000. The dataset table T6000 has records on a dataset basis. Each record has information of one dataset and includes, for example, a dataset identifier T6010, a user identifier T6020, an application identifier T6030, an MS identifier T6040, a model identifier T6050, a dataset storage location T6060, and a test program T6070.

The dataset identifier T6010 is an identifier for uniquely identifying information of the relevant dataset in the table T6000 and, for example, a serial number of the like is assigned by the data management program 4010.

The user identifier T6020 is an identifier of a user who registered the information of the dataset, that is, an identifier for uniquely identifying the application developer.

The application identifier T6030 is an identifier for uniquely identifying the application including the MS-model pair (the evaluation source pair) to be evaluated by using the dataset.

The MS identifier T6040 is an identifier for uniquely identifying the MS of the evaluation source pair.

The model identifier T6050 is an identifier for uniquely identifying the model of the evaluation source pair.

The dataset storage location T6060: is information indicating the location where a file which is a substance of the dataset used for the evaluation is stored; and may be, for example, a URL for uniquely identifying the file in the dataset repository R4300 where the file is stored.

The test program T6070 is information indicating a program file for executing the evaluation by using the file, which is the substance of the dataset, and may be, for example, information indicating the storage location of the program file (for example, a URL used to acquire the file from the dataset repository R4300, in which the program file is stored, via the repository management program T4020 (a URL for uniquely identifying the program file)).

FIG. 9 illustrates a configuration example of the feedback table T7000.

The feedback table T7000 has records on an evaluation result basis (the evaluation of appropriateness of the evaluation destination pair to replace the evaluation source pair). Each record has feedback information of one evaluation result and includes, for example, an evaluation result identifier T7010, an evaluation source identifier T7020, an evaluation destination identifier T7030, an FB evaluated value T7040, an evaluation reason T7050, a user identifier T7060, a time stamp T7070, and a reflected flag T7080. The feedback table T7000 is a table in which a feedback indicating whether the result of the recommendation about the MS-model pair recommended as the replacement candidate was valid or not (for example, the result of the evaluation by the user (for example, the application developer 1000) by using the feedback screen G5000 (see FIG. 17)) is stored. The information stored in the feedback table T7000 is used to adjust the weighting factor in processing of the evaluation program 3030. Incidentally, the adjustment of the weighting factor is executed by the weight adjustment program 3060 regularly, for example, once every day (or may be executed irregularly).

The evaluation result identifier T7010 is an identifier for uniquely identifying the feedback information in the table T7000 and, for example, a serial number of the like is assigned by the data management program 4010.

The evaluation source identifier T7020 is an identifier for uniquely identifying the evaluation source pair which is a feedback target.

The evaluation destination identifier T7030 is an identifier for uniquely identifying the evaluation destination pair which is a feedback target.

The FB evaluated value T7040 indicates an evaluated value indicating whether or not the evaluation destination pair is appropriate as the replacement candidate for the evaluation source pair. The FB evaluated value T7040 may be any value as long as it can evaluate whether or not the evaluation destination pair is appropriate as the replacement candidate.

The evaluation reason T7050 is information indicating a reason for the FB evaluated value T7040 and is, for example, a text indicating the reason such as "New MS and old MS are not compatible with each other in API specifications" or "New and old models have different properties."

The user identifier T7060 is a threshold value for uniquely identifying a user who conducted the evaluation and is, for example, an identifier of the application developer.

The time stamp T7070 is information indicating a time of day when the evaluation was conducted. That information may be, for example, a character string or a numerical value as long as it is information indicating the time of day.

The reflected flag T7080 is a flag indicating whether or not the feedback information has been reflected in the adjustment of the weighting factor stored in the weighting factor table T5000. The reflected flag T7080 is, for example, "False" indicating that it is not reflected at the time point of registration of the feedback; and after the feedback information is reflected by the weight adjustment program 3060, the reflected flag T7080 is changed to "True" by the weight adjustment program 3060. Any format other than the flag may be adopted as long as it is in a format capable of discriminating whether or not the feedback information has been reflected in the adjustment of the weighting factor stored in the weighting factor table T5000.

An example of processing performed in this embodiment will be explained below.

Figure 10:
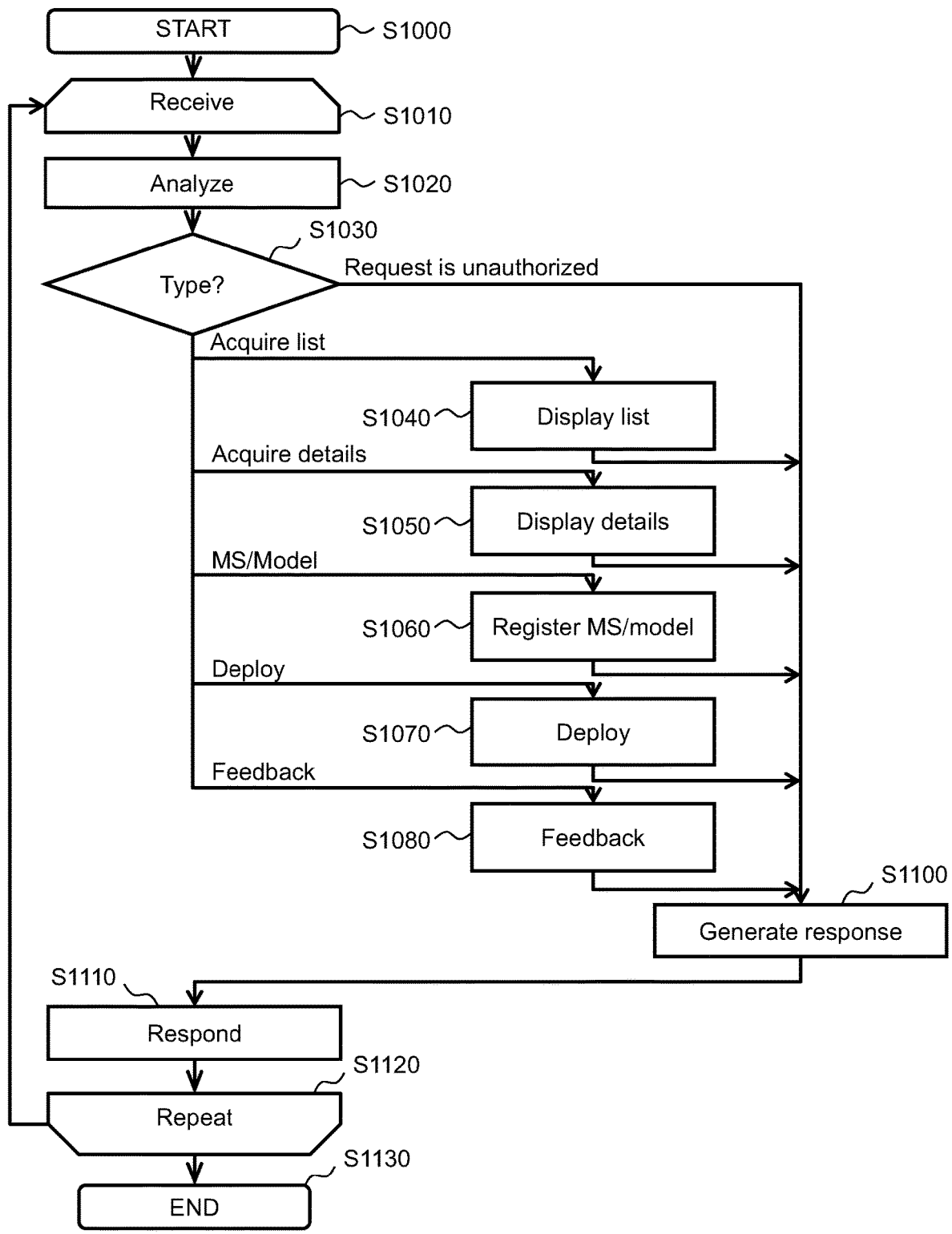
FIG. 10 is a diagram illustrating a flowchart of an I/F program.

FIG. 10 is a flowchart illustrating processing of the I/F program 3010 for receiving a request from the application development computer 1005, the MS development computer 1015, or the model development computer 1025 (the application developer 1000, the MS developer 1010, or the model developer 1020), executing processing for the request, and transmitting a response.

When the I/F program 3010 is executed, the I/F program 3010 starts waiting for a request in step S1000. Examples of request types include, for example, acquisition of a list of MS's/models managed by the marketplace computer 3500, acquisition of detailed information of the MS/model, registration of the MS/model or the application, deployment of the application, and feedback registration and there may be request types other than those listed above.

In step S1010, the I/F program 3010 receives the request. Then, the processing proceeds to step S1020.

In step S1020, the I/F program 3010 analyzes information included in the received request, for example, a type of the request, an identifier for identifying a target MS/model, and an identifier of a user who made the request. Then, the processing proceeds to step S1030. Incidentally, in step S1020, for example, processing for testing whether or not the format and content of data included in the request such as the type of the request are valid.

In step S1030, the I/F program 3010 judges the type of the analyzed request. The processing proceeds according to the judged type. Incidentally, if it is determined as a result of the implemented test in step S1020 that the request is not valid, the processing proceeds to step S1100 and the I/F program 3010 may generate a response indicating that the request is not valid.

If the judgment result in step S1030 is the acquisition of the MS/model list, the processing proceeds to step S1040. In step S1040, for example, the I/F program 3010 executes the MS/model management program 3020 to collect necessary information for the MS/model list screen G2000 (see FIG. 14). The MS/model management program 3020 acquires the information of all the records of the MS table T2000 and the model table T3000. Then, the processing proceeds to step S1100.

If the judgment result in step S1030 is the acquisition of the detailed information of the MS/model, the processing proceeds to step S1050. In step S1050, the I/F program 3010 executes the MS/model management program 3020 to collect necessary information to draw the MS details screen G3000 (see FIG. 15) and the model details screen G4000 (see FIG. 16). The model management program 3020 acquires information of a model identifier for uniquely identifying the MS and the model from the content of the request and then acquires information of records which correspond to the identifiers from the MS table T2000 and the model table T3000. Subsequently, the processing proceeds to step S1100.

If the judgment result in step S1030 is the MS/model registration processing, the processing proceeds to step S1060. In step S1060, the I/F program 3010 acquires necessary information to register the MS and the model from the request analyzed in step S1020 and adds the information as a new record to the MS table T2000 and the model table T3000. Subsequently, the processing proceeds to step S1100.

If the judgment result in S1030 is the application deployment request, the processing proceeds to step S1070. In step S1070, the I/F program 3010 acquires necessary information for the deployment of the application from the request analyzed in step S1020, adds the information as a new record to the application table T1000, and activates the deployment program 3050. Subsequently, the processing proceeds to step S1100. The activated deployment program 3050 deploys the application, which is recorded in the application table T1000, to the execution computer 5100 possessed by one or a plurality of clouds.

If the judgment result in S1030 is the feedback information registration, the processing proceeds to step S1080. In step S1080, the I/F program 3010 registers the feedback information in the feedback table T7000. Then, the processing proceeds to step S1100.

In step S1100, the I/F program 3010 generates response data to be transmitted to a request source computer, such as information of the MS/model list screen and the result of the MS/model registration, on the basis of the data collected according to the request.

In step S1110, the I/F program 3010 transmits the response data, which was generated in step S1100, to an evoking source computer. Then, the processing proceeds to step S1120.

In step S1120, if a request to terminate the I/F program 3010 is not made by the OS or the like, the processing returns to step S1010. In step S1120, if the termination request is made, the processing proceeds to step S1130 and the program terminates.

Incidentally, the request judged in step S1020 may include other types such as acquisition or update of user information of the application developer 1000, the MS developer 1010, or the model developer 1020, and stoppage or deletion of the deployed application.

Moreover, an element(s) described as a screen in this embodiment may be implemented by the API having parameters corresponding to input/output items of the screen.

Figure 11:
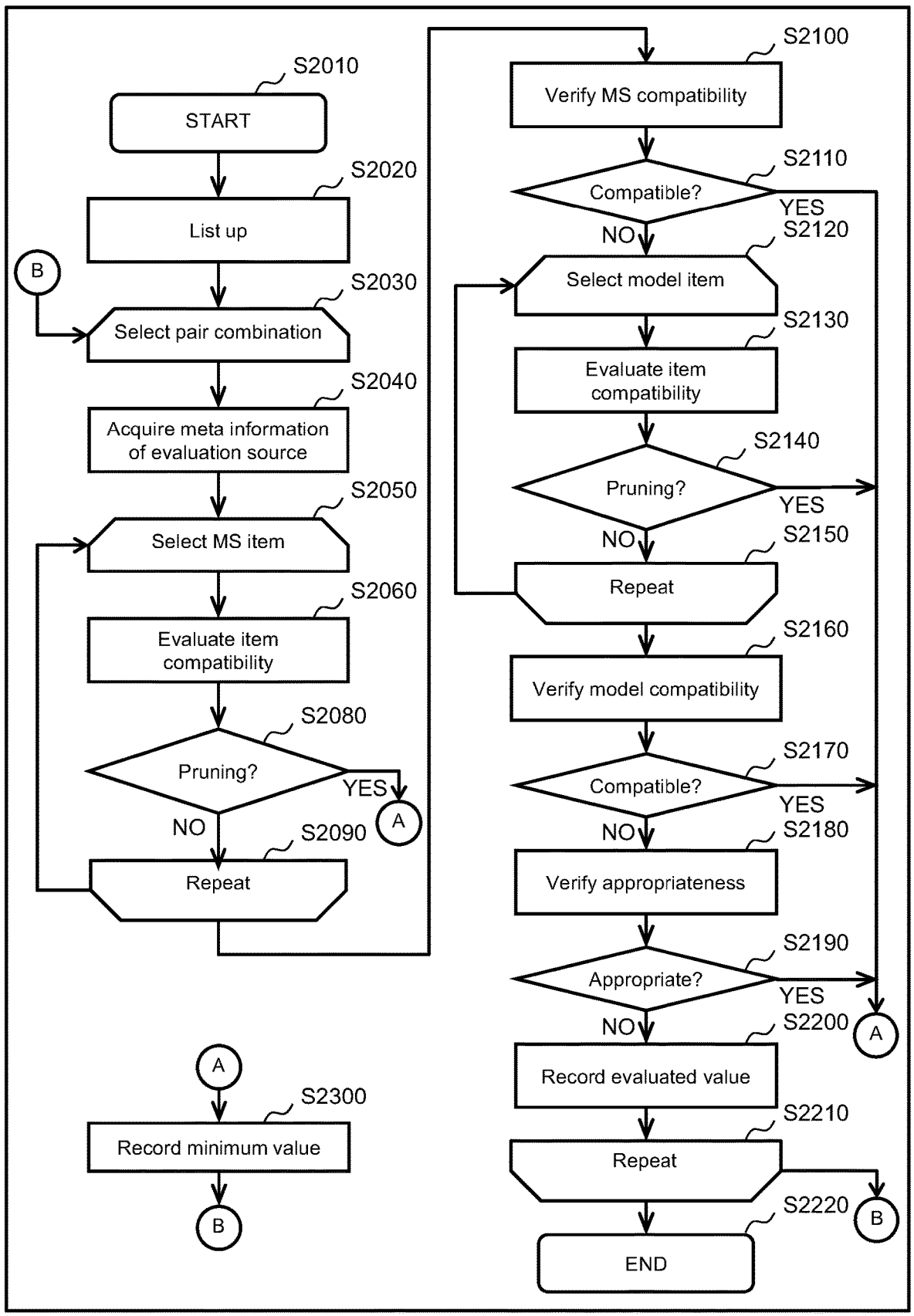
FIG. 11 is a diagram illustrating a flowchart of an evaluation program.

FIG. 11 is a flowchart illustrating processing of the evaluation program 3030 when evaluating an MS-model pair which becomes a replacement candidate for the MS-model pair.

It is assumed that the evaluation program 3030 is executed on the marketplace computer 3500 regularly, for example, once every day; however, besides the above-described example, for example, the evaluation program 3030 may be executed from another program at an arbitrary frequency.

When the evaluation program 3030 is executed, the processing is executed from step S2010 and the processing proceeds to step S2020.

In step S2020, the evaluation program 3030 lists up all combinations of the evaluation source pair and the evaluation destination pair. Specifically speaking, for example, in step S2020, the evaluation program 3030 firstly acquires the current time of day. Next, the evaluation program 3030 reads all the records of the MS table T2000 and the model table T3000 and creates MS-model pairs in a round-robin manner based on the identifiers of MS's and models. For example, if there are an MS with the identifier "1," an MS with the identifier "2," a model with the identifier "1," and a model with the identifier "2," there will be four patterns of the MS-model pairs, that is, 1-1, 1-2, 2-1, and 2-2. Next, the evaluation program 3030 creates combination patterns between the evaluation source pairs and the evaluation destination pairs in a round-robin manner in order to list up the evaluation source pairs and the evaluation destination pairs. For example, if the above-mentioned four types of the MS-model pairs are created, the following 12 patterns of combinations are listed up as combinations of the evaluation source pair and the evaluation destination pair (the evaluation source pair vs. the evaluation destination pair): 1-1 vs. 1-2, 1-1 vs. 2-1, 1-1 vs. 2-2, 1-2 vs. 1-1, 1-2 vs. 2-1, 1-2 vs. 2-2, 2-1 vs. 1-1, 2-1 vs. 1-2, 2-1 vs. 2-2, 2-2 vs. 1-1, 2-2 vs. 1-2, and 2-2 vs. 2-1. Next, the evaluation program 3030 adds one record for each pattern to the evaluation table T4000, records the identifier of the evaluation source pair as the evaluation source identifier T4030, and records the identifier of the evaluation destination pair as the evaluation destination identifier T4040. Incidentally, in the stage of step S2020, the evaluated value T4050 may be a null character, "0," or the like. Moreover, the evaluation time identifier T4020 may be the acquired current time of day or other type of information which can identify the number of times of the evaluation processing which is regularly executed. As soon as the above-described processing is completed, the processing proceeds to step S2030.

In step S2030, the evaluation program 3030 acquires one of the listed-up patterns (the pair combinations which are the combinations of the evaluation source pair and the evaluation destination pair) from the evaluation table T4000. Then, the processing proceeds to step S2040.

In step S2040, the evaluation program 3030 acquires the meta information of each MS from the MS table T2000 and the meta information of each model from the model table T3000 on the basis of the respective identifiers of the MS and the model which constitute the evaluation source pair and the respective identifiers of the MS and the model which constitute the evaluation destination pair, which are possessed by the information of the selected pair combination. Then, the processing proceeds to step S2050. The meta information of the MS will be hereinafter sometimes referred to as "MS meta information" and the meta information of the model will be hereinafter sometimes referred to as "model meta information." Moreover, an information item(s) of the MS meta information will be hereinafter sometimes referred to as an "MS item(s)" and an information item(s) of the model meta information will be hereinafter sometimes referred to as a "model item(s)."

In step S2050, the evaluation program 3030 selects one MS item from among the acquired MS meta information (for example, the category level 1 T2051, the category level 2 T2052, the category level 3 T2053, the developer identifier T3054, the API specifications T2055, and the default model identifier T2056). Then, the processing proceeds to step S2060.

In step S2060, the evaluation program 3030 compares the information of the evaluation source MS with the information of the evaluation destination MS with respect to the selected MS item and evaluates whether there is compatibility between the two MS's. If regarding the evaluation of the MS item, for example, the category levels 1 T2051 are the same, the evaluation program 3030 decides a sub-evaluated value "1" regarding the category level 1; and otherwise, the evaluation program 3030 decides the sub-evaluated value "0." Next, the evaluation program 3030 multiples the decided sub-evaluated value by the weighting factor T5030 of the distance between the category levels 1 T5500 (the evaluation item corresponding to the category level 1). The weighting factor T5030 is acquired from the weighting factor table T5000 in which the weighting factors for each item such as the distance between the category levels 1 T5500, the distance between the category levels 2 T5501, and the distance between the category levels 3 T5502. The product of the sub-evaluated value by the weighting factor is defined as the evaluated value $S_i$ for each item. Then, the processing proceeds to step S2080. The character i herein used represents an item.

Now, some examples other than the category levels will be explained with respect to the selected MS item.

For example, if the selected MS item is the API specifications T2055, the evaluation program 3030 compares the API specifications T2055 of the evaluation source MS with the API specifications T2055 of the evaluation destination MS and calculates the evaluated value regarding the API specifications T2055 on the basis of the sub-evaluated value in accordance with the degree of coincidence of the API specifications T2055 and the weighting factor T5030 corresponding to the API specifications T2055 (the MS API compatibility T5503). For example, the API specifications T2055 are completely the same, the sub-evaluated value is set as "2." If the input specifications of the evaluation source MS are contained in the input specifications of the evaluation destination MS and there is an additional item(s), the sub-evaluated value is set as "1.5." If the input specifications are the same, but the output specifications are different, the sub-evaluated value is set as "1.0." Accordingly, the evaluated value $S_i$ of the MS API compatibility may be calculated by multiplying the sub-evaluated value, which is obtained by quantifying the degree of coincidence of the API specifications (for example, which item coincides with each other, and whether or not the information corresponding to the evaluation destination coincides with at least a specified part of the information corresponding to (or contains the relevant part of) the evaluation source), by the value of the MS API compatibility T5503 included in the weighting factor table T5000.

Alternatively, for example, if the selected MS item is the model specifications T2057, the evaluation program 3030 compares the model specifications T2057 of the evaluation source MS with the model specifications T2057 of the evaluation destination MS and calculates the evaluated value regarding the model specifications T2057 on the basis of the sub-evaluated value in accordance with the degree of coincidence of the model specifications T2057 and the weighting factor T5030 corresponding to the model specifications T2057 (the model specifications compatibility T5504). For example, if the evaluation source MS and the evaluation destination MS have the same model specifications T2057, the sub-evaluated value is set as "2." If the model specifications T2057 of the evaluation destination MS contains the model specifications T2057 of the evaluation source MS, the sub-evaluated value is set as "1." If at least a specified item of the model specifications T2057 is different, the sub-evaluated value is set as "0." The evaluated value $S_i$ regarding the model specifications T2057 may be calculated by multiplying the above-described sub-evaluated value by the value of the model specifications compatibility T5504.

Alternatively, for example, if the item of the meta information of the selected MS is the developer identifier T2054, the evaluation program 3030 compares the developer identifier T2054 of the evaluation source MS with the developer identifier T2054 of the evaluation destination MS and calculates the evaluated value regarding the developer identifier T2054 on the basis of the sub-evaluated value in accordance with the degree of coincidence of the developer identifier T2054 and the weighting factor T5030 corresponding to the developer identifier T2054 (the developer relevance T5505). For example, if the developer of the evaluation source MS and the developer of the evaluation destination MS are the same, that is, if they have the same value of the developer identifier T2054, the sub-evaluated value is set as "1"; and if they have different values, the sub-evaluated value is set as "0." The evaluated value $S_i$ regarding the developer identifier T2054 is calculated by multiplying the above-described sub-evaluated value by the value of the developer relevance T5503. Incidentally, the developers are not the same, but, for example, they belong to the same organization, the sub-evaluated value may be set as "0.5." Specifically speaking, there may not necessarily be the two options of whether the developers are the same or not; and the distance meaning the relevance between the developers may be one element for calculating the evaluated value.

Alternatively, for example, if the selected MS item is the version T2030, the evaluation program 3030 calculates the evaluated value regarding the version T2030 on the basis of the sub-evaluated value in accordance with the relevance between the version T2030 of the evaluation source MS and the version T2030 of the evaluation destination MS and the weighting factor T5030 corresponding to the version T2030 (version parent etc. distance T5506). For example, the evaluation program 3030 acquires version change history information of the evaluation source MS and version change history information of the evaluation destination MS from the MS repository R4100 via the repository management program 4020 on the basis of the MS identifier T2010 and the version information T2010. The acquired version change history information includes information about a parent-child relationship information regarding each version of each MS. For example, if the evaluation destination MS is a direct descendant of the evaluation source MS, there is a high possibility that the compatibility between the MS's is high, so that the sub-evaluated value is set as "2"; if the evaluation destination MS is a collateral descendant of the evaluation source MS, the sub-evaluated value is set as "1"; and if the evaluation destination MS and the evaluation source MS do not have the parent-child relationship, there is a high possibility that their compatibility is low, so that the sub-evaluated value is set as "0." The evaluated value regarding the version T2030 is calculated by multiplying the above-described sub-evaluated value by the value of the weighting factor T5030 of the version parent etc. distance T5506.

The comparison target MS item(s) exemplified above may be any MS item other than those listed above as long as to what degree the replacement of the evaluation source MS with the evaluation destination MS is appropriate can be expressed with a numerical value.

In step S2080, the evaluation program 3030 judges whether or not the evaluation destination MS is a target of pruning in the stage of implementing step S2060. If it is determined as a result of the judgment that there is no compatibility and it is the target of the pruning processing, the processing proceeds to step S2300; and otherwise, the processing proceeds to step S2090. Incidentally, whether the evaluation destination MS is the target of pruning or not may be judged by judging whether the evaluated value $S_i$ calculated regarding the MS item is equal to or smaller than the pruning threshold value T5040 corresponding to the relevant MS item. Furthermore, since the pruning is performed in step S2300, the evaluation program 3030 records the minimum evaluated value (for example, "0") in the evaluation table T4000 as the evaluated value T4050 of the evaluation destination pair.

In step S2090, the evaluation program 3030 checks if there is any MS item which has not been evaluated remains or not. If such MS item remains, the processing returns to step S2050; and if no such MS item remains, the processing proceeds to step S2100.

In step S2100, the evaluation program 3030 calculates MS compatibility (a value indicating a degree of compatibility between the evaluation source MS and the MS at the evaluation destination which becomes the recommendation candidate). In order to calculate the MS compatibility, for example, the evaluation program 3030 may find a value obtained by multiplying a total value of the evaluated value $S_i$ of the MS item (Mathematical Expression 1 indicated below) by the weighting factor and the obtained value may be defined as the compatibility w between the MS's. Then, the processing proceeds to step S2110. Incidentally, the weighting factor may be, for example, the weighting factor T5030 corresponding to the MS compatibility T5500.

$$\Sigma_{i=1}^{n} S_i \qquad \text{[Math. 1]}$$

In step S2110, the evaluation program 3030 judges whether or not the compatibility w is equal to or larger than a specified threshold value. If the compatibility ω is equal to or larger than the threshold value, it is judged that there is compatibility between the MS's and, therefore, the processing proceeds to step S2120. Otherwise, it is judged that there is no compatibility between the MS's and, therefore, the processing proceeds to step S2300. Incidentally, the threshold value may be, for example, the pruning threshold value T5040 corresponding to the MS compatibility T5500.

In step S2120, the evaluation program 3030 selects one model item from the model meta information T3050 of the evaluation source and the evaluation destination, which was acquired in step S2040 (for example, the category level 1 T3051, the category level 2 T3052, the category level 3 T3053, the developer identifier T3054, the importance focus label T3055, the importance focus index T3056, and the index T3057). Then, the processing proceeds to step S2130.

In step S2130, the evaluation program 3030 compares the information of the evaluation source model with the information of the evaluation destination model with respect to the selected model item and evaluates whether there is compatibility between the two models. Regarding the evaluation of the model item, for example, if the category levels 1 T3051 are the same, the evaluation program 3030 decides the sub-evaluated value "1" regarding the category level 1; and otherwise, the evaluation program 3030 decides the sub-evaluated value "0." Next, the evaluation program 3030 multiplies the decided sub-evaluated value by the weighting factor T5030 of the distance between the category levels 1 T5500 (the evaluation item corresponding to the category level 1). The weighting factor T5030 is acquired from the weighting factor table T5000 in which the weighting factor for each item is recorded. The numerical value obtained by multiplication by the weighting factor is defined as the evaluated value $M_j$ for each model item and the processing proceeds to step S2140. The character j herein used indicates an item.

The model item may be any model item other than the category level 1 T3051 exemplified above, the category level 2 T3052, or the category level 3 T3053 as long as it can compare and evaluate the compatibility between the evaluation source model and the evaluation destination model; and regarding a parent-child relationship between the models by using the version T3030, the relevance between the developers by using the developer identifier T3054, and the model specifications T3058, the evaluation may be implemented by the same method as that used for the evaluation between the MS's as explained in step S2060.

Alternatively, if the selected model item is the importance focus label T3055, the evaluation program 3030 judges whether or not the importance focus label T3055 of the evaluation source and the importance focus label T3055 of the evaluation destination are the same. For example, if the importance focus labels T3055 are the same, the sub-evaluated value is set as "2"; and if the importance focus labels T3055 are different, the sub-evaluated value is set as "1." The importance focus label T3055 is at least part of the properties of the model; and if the importance focus label varies between the evaluation source and the evaluation destination, it can give significant influence on the tendency of the result of a deduction or the like when the evaluation source is replaced with the evaluation destination. Therefore, if the importance focus labels T3055 are different, the sub-evaluated value is set to be a small value. A value obtained by multiplying the sub-evaluated value by the weighting factor corresponding to the importance focus label T3055 (the importance focus label appropriateness T5507) is set as the evaluated value $M_j$.

Alternatively, if the selected model item is the importance focus index T3056, the evaluation program 3030 judges whether or not the importance focus index T3056 of the evaluation source and the importance focus index T3056 of the evaluation destination are the same. For example, if the importance focus indexes T3056 are the same, the sub-evaluated value is set as "2"; and if the importance focus indexes T3056 are different, the sub-evaluated value is set as "1." The importance focus index T3056 is also at least part of the properties of the model; and if the importance focus index varies between the evaluation source and the evaluation destination, it can give significant influence on the tendency of the result of a deduction or the like when the evaluation source is replaced with the evaluation destination. Therefore, if the importance focus indexes T3056 are different, the sub-evaluated value is set to be a small value. A value obtained by multiplying the sub-evaluated value by the weighting factor corresponding to the importance focus index T3056 (the importance focus index appropriateness T5508) is set as the evaluated value $M_j$.

Alternatively, if the selected model item is the index T3057, the evaluation program 3030 compares the index T3057 of the evaluation source model with the index T3057 of the evaluation destination model and calculates the evaluated value regarding the index T3057 on the basis of the sub-evaluated value according to superiority or inferiority of the index T3057 and the weighting factor T5030 corresponding to the index T3057 (the index improvement degree T5509). For example, regarding the result of the evaluation conducted by using the evaluation data with respect to each model, the evaluation program 3030 compares the evaluation indexes such as "Accuracy" and "Precision" from the viewpoint of the machine learning and sets a value indicating whether or not the evaluation destination model is improved relative to the evaluation source model, as the sub-evaluated value. For example, if the evaluation destination model is superior to the evaluation source model with respect to all the items such as "Accuracy" and "Precision," the sub-evaluated value may be set as "2"; and if the evaluation destination model is inferior to the evaluation source model with respect to one item, the evaluated value may be set as "1.5." Regarding the index item which corresponds to the importance focus index T3056, the influence degree on the sub-evaluated value may be set higher than the influence degree of other index items which do not correspond to the importance focus index T3056, depending on whether or not the value of the evaluation destination is superior to the value of the evaluation source. Regarding one or more index items regarding which the evaluation source and the evaluation destination match each other in their indexes T3057, the sub-evaluated value corresponding to the index T3057 may be calculated on the basis of at least one of how many index items exist regarding which the value of the evaluation destination is superior to the value of the evaluation source, and whether the index items regarding which the value of the evaluation destination is superior to the value of the evaluation source are the items corresponding to the importance focus index T3056. The evaluated value $M_j$ corresponding to the index T3057 may be calculated by multiplying the sub-evaluated value by the value of the weighting factor T5030 corresponding to the index T3057 (the index improvement degree T5509).

The comparison target model item(s) exemplified above may be any model item other than those listed above as long as to what degree the replacement of the evaluation source model with the evaluation destination model is appropriate can be expressed with a numerical value.

In step S2140, the evaluation program 3030 judges whether or not the evaluation destination model is a target of pruning in the stage of implementing step S2130. If it is determined as a result of the judgment that there is no compatibility and it is the target of the pruning processing, the processing proceeds to step S2300; and otherwise, the processing proceeds to step S2150. Incidentally, whether the evaluation destination model is the target of pruning or not may be judged by judging whether the evaluated value $M_j$ calculated regarding the model item is equal to or smaller than the pruning threshold value T5040 corresponding to the relevant model item.

In step S2150, the evaluation program 3030 checks if there is any model item which has not been evaluated remains or not. If such model item remains, the processing returns to step S2120; and if no such model item remains, the processing proceeds to step S2160.

In step S2160, the evaluation program 3030 calculates model compatibility (a value indicating a degree of compatibility between the evaluation source model and the model at the evaluation destination which becomes the recommendation candidate). In order to calculate the model compatibility, for example, the evaluation program 3030 may find a value obtained by multiplying a total value of the evaluated value $S_i$ of the model item (Mathematical Expression 2 indicated below) by the weighting factor and the obtained value may be defined as the compatibility $\varphi$ between the model's. Then, the processing proceeds to step S2170. Incidentally, the weighting factor may be, for example, the weighting factor T5030 corresponding to the model compatibility T5500.

$$\Sigma_{i=1}^{n} M_j \qquad \text{[Math. 2]}$$

In step S2170, the evaluation program 3030 judges whether or not the compatibility $\varphi$ is equal to or larger than a specified threshold value. If the compatibility $\varphi$ is equal to or larger than the threshold value, it is judged that there is compatibility between the model's and, therefore, the processing proceeds to step S2180. Otherwise, it is judged that there is no compatibility between the model's and, therefore, the processing proceeds to step S2300. Incidentally, the threshold value may be, for example, the pruning threshold value T5040 corresponding to the model compatibility T5501.

In step S2180, the evaluation program 3030 calculates an aptitude degree θ indicating how high the possibility capable of applying the model of the relevant evaluation destination to the MS of the evaluation destination selected in step S2030 is. Then, the processing proceeds to step S2190. All or some elements of the appropriateness θ may be, for example, the degree of coincidence between the model specifications T2057 included in the MS table T2000 and the model specifications T3058 in the model table T3000. The relevant degree of coincidence may be decided based on at least one of to what degree both the format of the model file and the dimensionality of data which can be input are the same between the MS and the model, and to what degree the names of the dimensions of the input data are the same between the MS and the model (for example, if the difference in the name of the dimension is slight as in "chronological bearing vibration data" and "chronological coil vibration data," a degree of decrease in the degree of coincidence may be slight). Furthermore, the aptitude degree θ may be calculated by multiplying the relevant degree of coincidence by the value of the weighting factor T5030 corresponding to the MS/model appropriateness T5510.

In step S2190, the evaluation program 3030 judges whether the aptitude degree θ between the MS of the evaluation destination and the model of the evaluation destination is equal to or larger than a specified threshold value. If the aptitude degree θ is equal or larger than the threshold value, it is judged that there is aptitude and, therefore, the processing proceeds to step S2200. Otherwise, it is judged that there is no aptitude and, therefore, the processing proceeds to step S2300. Incidentally, the threshold value may be, for example, the pruning threshold value T5040 corresponding to the MS/model appropriateness T5503.

In step S2200, the evaluation program 3030 calculates an evaluated value $E_k$ indicating to what degree it is appropriate to replace the evaluation source pair with the evaluation destination pair with respect to the pair combination selected in step S2030 and adds a record including the evaluated value $E_k$ as a new record to the evaluation result table T4000. Then, the processing proceeds to step S2010.

The additional character k herein used is the number for identifying a pair combination (a combination of the evaluation source pair and the evaluation destination pair). The number k may be the number which starts from, for example, 1 and increases by one for every combination (natural number) or may be any other information as long as it is information capable of uniquely identifying the relevant combination. The evaluated value $E_k$ is based on the compatibility ω found in step S2100 (the value indicating how high the compatibility between the evaluation source MS and the evaluation destination MS is), the compatibility φ found in step S2160 (the value indicating how high the compatibility between the evaluation source model and the evaluation destination model is), and the aptitude degree θ between the MS and the model at the evaluation destination. For example, the evaluated value $E_k$ may be expressed as $E_k=\omega+\varphi+\theta$. The evaluation program 3030 adds a record including $E_k$ (the evaluated value T4050) to the evaluation result table T4000. The relevant record may include the evaluation result identifier T4010, the evaluation time identifier T4020, the evaluation source identifier T4030, the evaluation destination identifier T4040, and the evaluation time of day T4060. Incidentally, the evaluation result identifier T4010 may include the additional character k.

In step S2210, the evaluation program 3030 checks whether there is any pair combination regarding which the evaluation has not been completed yet, among the pair combinations listed up in step S2020. If there is any pair combination regarding which the evaluation has not been completed yet, the processing returns to step S2030. If the evaluation has been completed regarding all the pair combinations, the processing proceeds to step S2220 (that is, the processing terminates).

Figure 12:
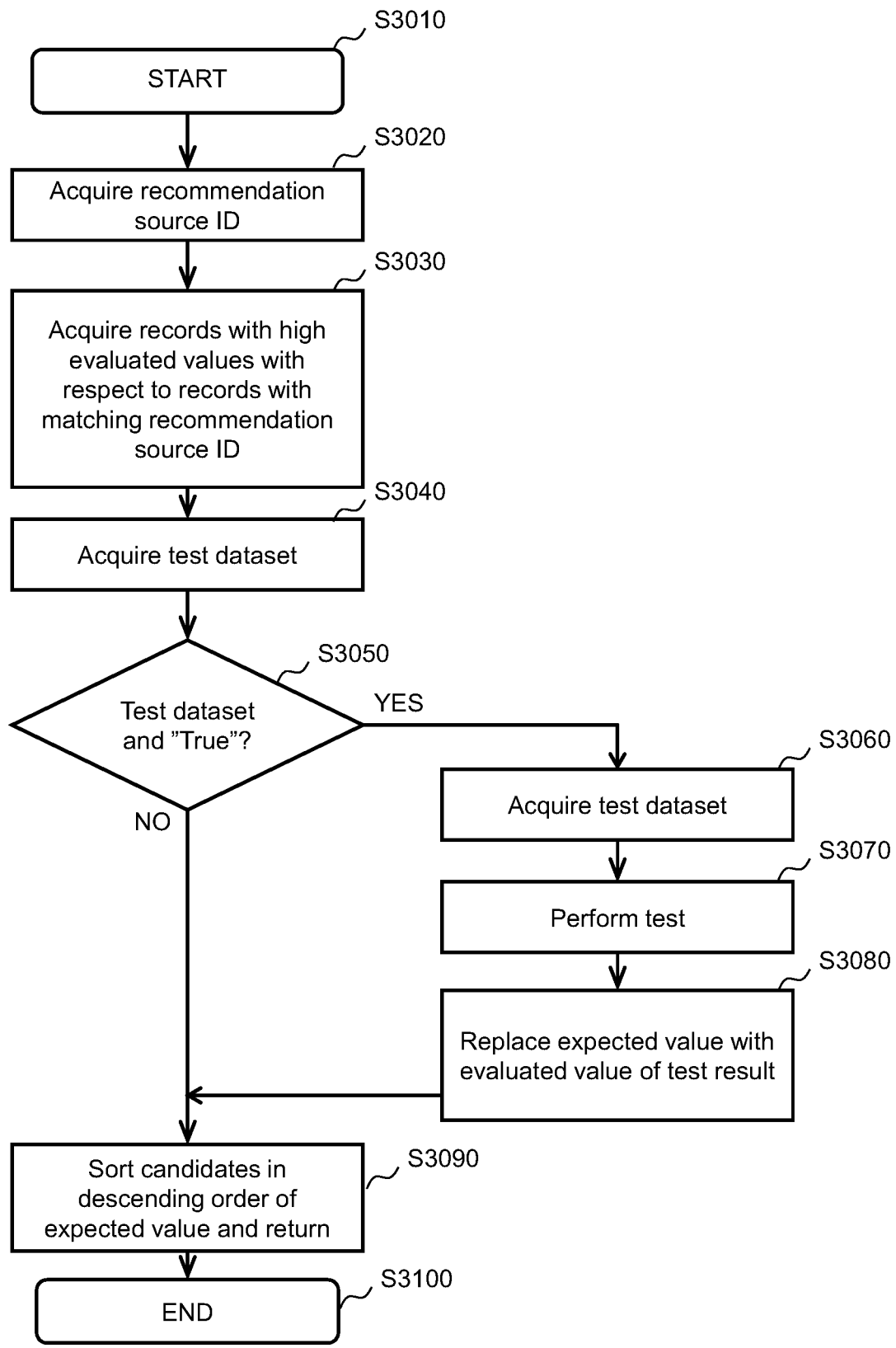
FIG. 12 is a diagram illustrating a flowchart of a candidate recommendation program.

FIG. 12 is a flowchart illustrating processing of the candidate recommendation program 3040 for recommending an MS-model pair which is appropriate as a replacement candidate on the basis of the evaluated value calculated by the evaluation program 3030 (the evaluated value T4050 calculated for each pair combination).

For example, when the application developer 1000 requests for the recommendation of the replacement of the MS-model pair designated by the application developer 1000 via a browser on the application development computer 1005, the application development support program 2010 is evoked via the I/F program 3010 or is evoked by the I/F program 3010 itself and the candidate recommendation program 3040 is executed on the marketplace computer 3500. Incidentally, when evoking the candidate recommendation program 3040, the I/F program 3010 delivers the identifiers of the MS and the model which are the replacement candidate source, the user identifier, the application identifier, and a test requirement flag to the candidate recommendation program 3040. Incidentally, the test requirement flag is a flag indicating whether or not to implement a test specialized in a specific application by using the dataset and the test program which are uploaded by the application developer 1000 and executed in steps S3060 to S3080. It requires a certain amount of time or longer to implement the test. Accordingly, for example, in a case where a replacement candidate (an MS-model pair) for the relevant MS-model pair is recommended in real time in response to the designation of the MS-model pair from the application developer 1000, the test requirement flag is set as "False" indicating that the test is to be not implemented. On the other hand, for example, if the real-time basis is not required for the recommendation of the candidate pair by, for example, executing the candidate recommendation program 3040 daily, the test requirement flag is set as "True" indicating that the test is to be implemented.

When the candidate recommendation program 3040 is executed, the processing is started from step S3010 and the processing proceeds to step S3020.

In step S3020, the candidate recommendation program 3040 acquires the MS identifier and the model identifier which are delivered from the evoking source program. A pair of the MS identifier and the model identifier which are acquired here is a recommendation source identifier (an identifier of the recommendation source MS-model pair). An example of the recommendation source MS-model pair is the MS-model pair designated by the application developer. The processing proceeds to step S3030.

In step S3030, the candidate recommendation program 3040 acquires records having the evaluation source identifier T4030, which matches the recommendation source identifier, from the evaluation table T4000 and sorts the acquired records in descending order of the evaluated value T4050 (in the order from the highest evaluated value T4050 to a lower evaluated value(s) T4050). The processing proceeds to step S3040. Incidentally, in step S3030, the acquired record(s) may have the evaluation source identifier T4030 which matches the recommendation source identifier, and additionally may be one or more records whose value of the evaluation time identifier T4020 is the largest. Incidentally, the acquired record(s) may be all the applicable records or may be records with top N evaluated values T4050 among the applicable records (an example of some records) (N is a natural number).

In step S3040, the candidate recommendation program 3040 refers to the dataset table T6000 and acquires records which match the user identifier, the application identifier, the MS identifier, and the model identifier which are acquired (delivered). The candidate recommendation program 3040 acquires the dataset storage location T6060 and the test program T6070 from each acquired record. The processing proceeds to step S3050.

In step S3050, the candidate recommendation program 3040 judges whether the record acquired in step S3040 exists or not. If the acquired record exists and the test requirement flag is True (that is, if the real-time basis is not required for the test), the processing proceeds to step S3060. If there is no record acquired in step S3040 (that is, the dataset and the test program for implementing the test do not exist) or if the test requirement flag is "False," the processing proceeds to step S3090.

In step S3070, the candidate recommendation program 3040 acquires the applicable dataset and the test program from the dataset repository R4300 on the basis of the information of the acquired dataset storage location T6060. The processing proceeds to step S3080.

In step S3080, the candidate recommendation program 3040 executes the test of the replacement candidate (the MS-model pair) for the recommendation source by using the acquired dataset and test program and acquires a test evaluation value. Furthermore, the candidate recommendation program 3040 replaces the evaluated value T4050 of each record acquired in step S3030 with the acquired test evaluation value. The processing proceeds to step S3090. Incidentally, the "test evaluation value" may be an arbitrary value which is the value output by the test program, for example, by using the index on which the application developer 1000 focuses the highest importance, such as "Accuracy" and "Precision" which is the evaluated value of the model in the machine learning. In addition, the test may be executed with regard to only some records whose evaluated value T4050 is high, among the records acquired in step S3030, or with regard to all candidates (all the records acquired in step S3030). However, if the test is executed only with regard to some replacement candidates (some MS-model pairs), the evaluated value T4050 of a record(s) including the information of the replacement candidate regarding which the test has not been implemented may be set as a minimum evaluated value such as 0.

In step S3090, the candidate recommendation program 3040 sorts the records acquired in step S3030 in the order from the highest evaluated value of each acquired replacement candidate to lower evaluated values (in descending order of the evaluated value) and returns information of the sorted records to the evoking source program. Then, the processing proceeds to step S3100, that is, the processing terminates. Incidentally, for example, the recommendation candidate list G1030 of the screen G1000 (see FIG. 13) and the replacement candidate list G3030 of the MS details screen G3000 (see FIG. 15) are displayed on the basis of the returned information (the information of the replacement candidates). Moreover, in step S3090, the evaluated value is either the evaluated value calculated by the evaluation program 3030 or the evaluated value calculated by the candidate recommendation program 3040 in S3080.

Examples of some screens displayed in this embodiment will be explained below. Incidentally, the screens explained below (for example, all or some of the screens) are examples of UI's (User Interfaces), particularly, for example, examples of GUI's (Graphical User Interfaces). Moreover, tools located on the relevant screen (for example, text boxes and buttons) may be an example of UI components (for example, GUI components). Furthermore, the screens may be provided by the I/F program 3010.

Figure 13:
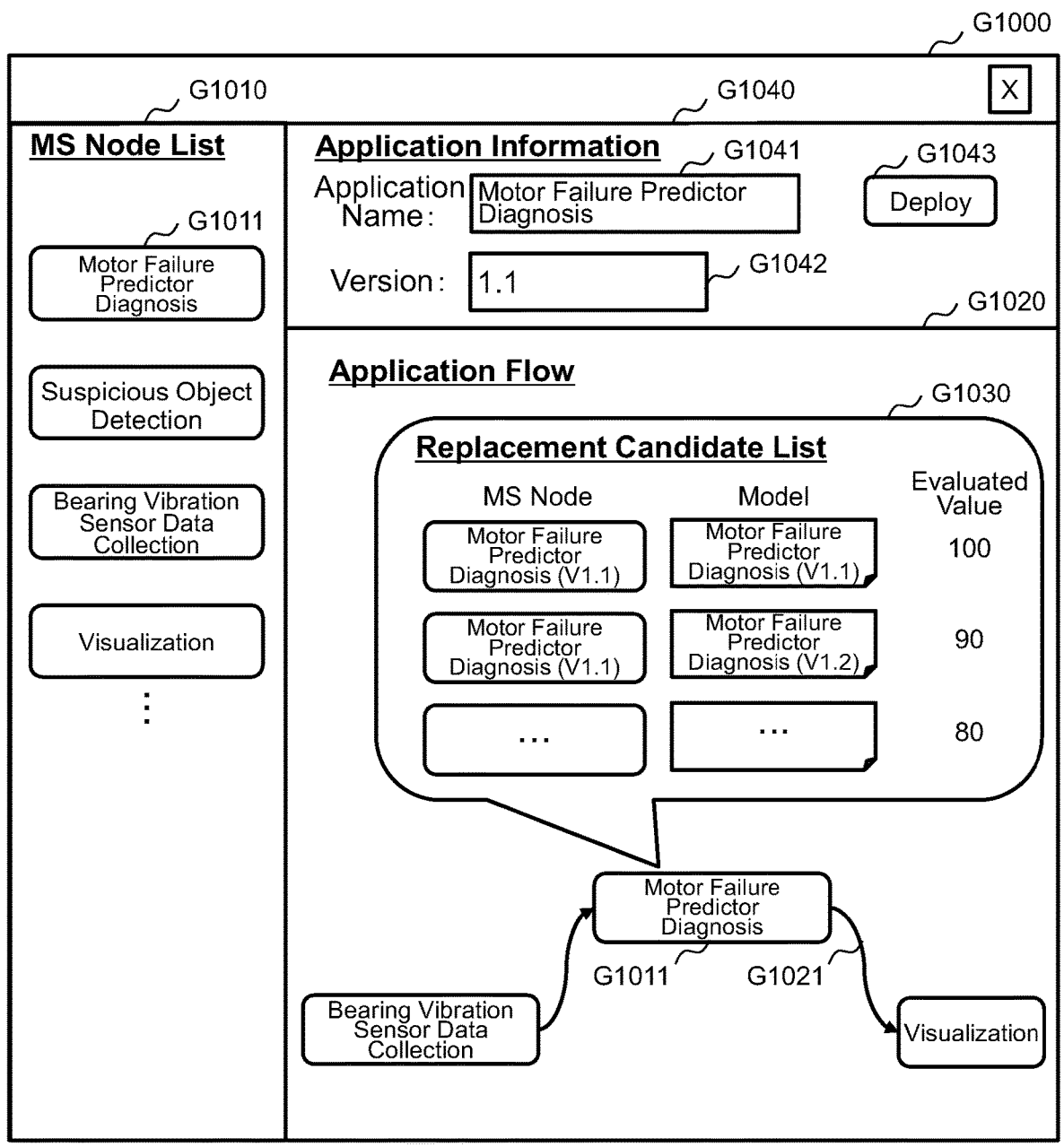
FIG. 13 is a diagram illustrating an implementation example of an application development screen.

FIG. 13 is a diagram illustrating an implementation example of the application development screen.

The application development screen G1000 is a screen used by the application developer 1000 when developing an application on the application development computer 1005, and is a screen provided by the application development support program 2010 to the application developer 1000. The application development screen G1000 includes an MS node list G1010, an application flow G1020, and application information G1040.

The MS node list G1010 includes a list of one or a plurality of MS nodes G1011. The MS node G1011 is a node of an MS provided by the marketplace system 3000 and formed in a format so that it can be used from a visual programming tool. In an example in FIG. 13, it is possible to express a flow of data and procedure called a "flow" for the MS's to receive and process data by connecting the MS nodes G1011 with a wire G1021.

The application flow G1020 visually expresses the flow. The application developer 1000 selects one MS node from the MS node list G1010, drags it to the application flow G1020, locates the MS node, and connects the one or the plurality of MS nodes together with the wire G1021, thereby expressing processing of the entire application and the flow of data. When the application developer 1000 places a mouse cursor on a desired MS node G1011, a replacement candidate list G1030 displayed in the application flow G1020 displays, for example, a list of MS-model pairs capable of replacement with respect to a pair of an MS corresponding to the MS node G1011 and a model using the MS. To place the mouse cursor on the MS node G1011 is an example of designation of the MS-model pair. The replacement candidate list may be a list of replacement candidates recommended by the candidate recommendation program 3040. When displaying the list, the value of the evaluated value T4050 of the replacement candidate (the MS-model pair) may be displayed for each replacement candidate.

The application information G1040 sets information of an application developed in the application flow G1020 and may include, for example, an application name G1041 and a version G1042 and may include a deploy button G1043 to deploy the application to an execution computer 5100 possessed by the cloud 5000. When the deploy button G1043 is pressed, the application corresponding to the flow expressed in the application flow G1020 may be deployed by the deployment program 3050.

FIG. 14 is a diagram illustrating an implementation example of an MS/model list screen.

The MS/model list screen G2000 is a screen provided to the application developer 1000 and is a screen for displaying a list of MS's and models registered in the marketplace. The screen G2000 includes MS images G2010 of one or a plurality of MS's registered in the marketplace system 3000, model images G2050 of one or a plurality of models, MS names G2020 of the MS's, model names G2060 of the models, a microservice registration button G2030 for registering a new MS, and a model registration button G2070 for registering a new model.

The information of the images and the names of the respective MS's and models displayed on the screen G2000 may be acquired from, for example, the MS table T2000 or the model table T3000 and, for example, the MS names T2020, the images 2060, the model names T3030, and the images T3060 may be displayed.

If the MS name or the MS image which is displayed is selected, the screen makes the transition to the MS details screen G3000; and if the model name or the model image is selected, the screen makes the transition to the model details screen G4000.

FIG. 15 is a diagram illustrating an implementation example of the MS details screen G3000.

The MS details screen G3000 is a screen viewed by the application developer when examining which MS to be adopted for the application and finding a replacement candidate for the MS. The MS details screen G3000 includes an MS name G3005, an MS image G3007, meta information G3010, version information G3015, an outline G3020, API specifications G3025, a replacement candidate list G3030, a new version registration button G3040, and a feedback button G3050.

The MS name G3005 indicates the name of the MS displayed on the MS details screen G3000 and is information of, for example, the MS name T2020 in the MS table T2000.

The MS image G3007 is an image expressing the image of the MS and is displayed based on information of, for example, the image T2060 in the MS table T2000.

The meta information G3010 is meta information of the relevant MS and is information based on, for example, the meta information T2050 of the MS table T2000. The relevant information may include, for example, the MS developer's name (for example, the MS developer's name acquired from a table which is not illustrated in the drawing, by using the developer identifier T2054 as a key), the category level 1 T2051 indicating the large category of the relevant MS, the category level 2 T2052 indicating the medium category of the relevant MS, and the category level 3 T2053 indicating the small category of the relevant MS.

The version information G3015 indicates version information of the relevant MS and is information of, for example, the version T2030 included in the MS table T2000.

The outline G3020 is a text for explaining the outline of the relevant MS and is information of, for example, the outline T2040 of the MS table T2000.

The API specifications G3025: indicate the API specifications used when another MS or the program evokes the MS; and is information of, for example, at least part of the API specifications T2050 included in the meta information T2050 of the MS table T2000.

The replacement candidate list G3030 displays a list of pairs of the MS and a model capable of replacement with respect to each application using the MS displayed on the relevant screen. The replacement candidate list may be a list of replacement candidates recommended as the replacement candidates by the candidate recommendation program 3040 and the evaluated value T4050 possessed by the evaluation table T4000 may be displayed as the evaluated value of the replacement candidate. Incidentally, whether each application is using the MS displayed on the MS details screen G3000 may be checked by referring to the application definition T1040 included in the application table T1000 and selecting the identifier of the MS corresponding to each node included in the definition from, for example, microservice_id.

The new version registration button G3040 is a button which is pressed when registering a new version of the MS regarding the relevant MS.

The feedback button G3050 is a button for making the transition to a screen where the application developer 1000 evaluates whether a candidate group evaluated and recommended by the evaluation program 3030 and the candidate recommendation program 3040 and displayed in the replacement candidate list G3030 or in the replacement candidate list G1030 in the application development screen G1000 are appropriate or not, and feedbacks the evaluation result. When this button G3050 is pressed, the screen makes the transition to a feedback screen G5000.

Figure 16:
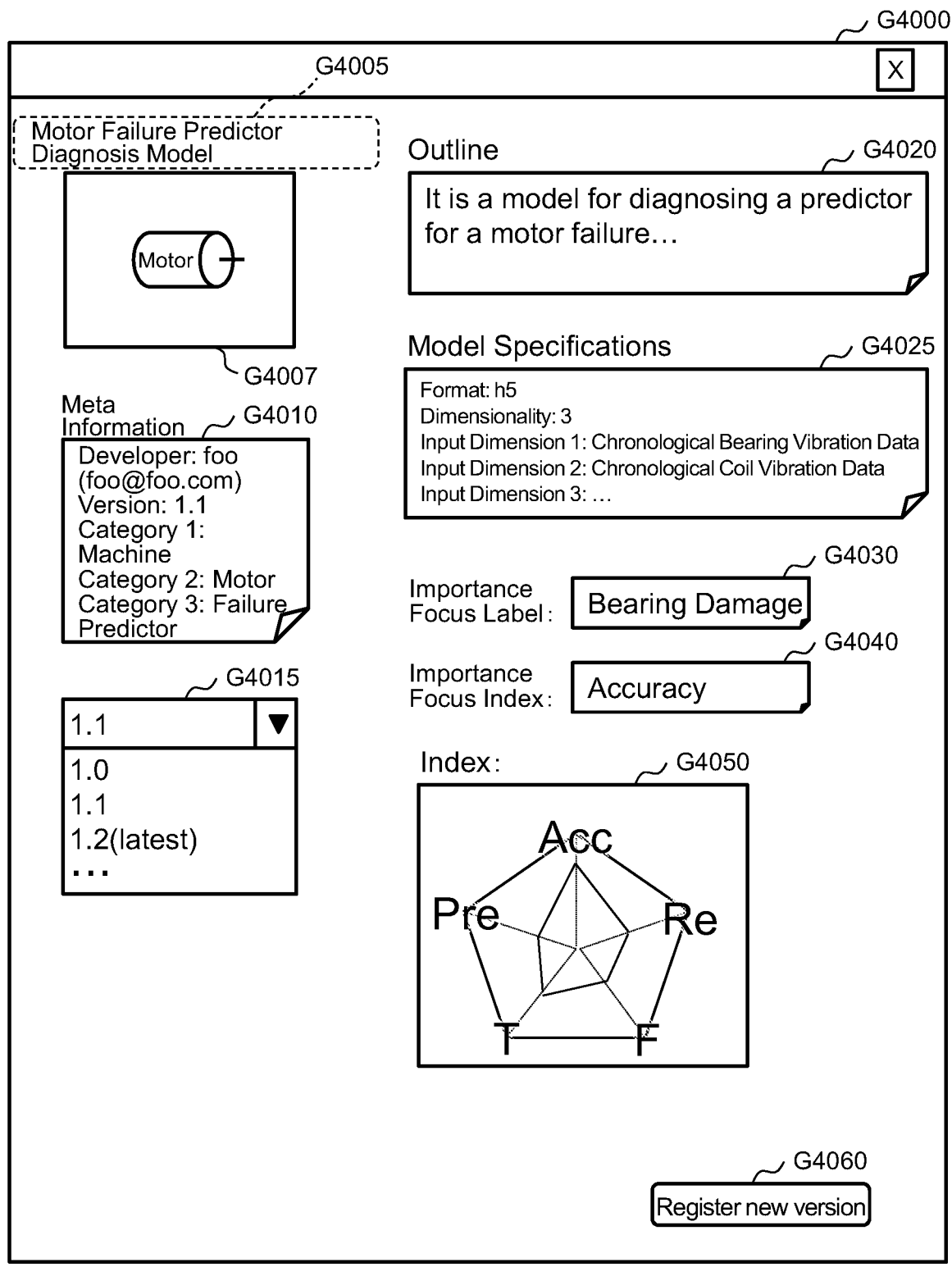
FIG. 16 is a diagram illustrating an implementation example of a model details screen.

FIG. 16 is a diagram illustrating an implementation example of a model details screen G4000.

The model details screen G4000 is a screen viewed by the application developer 1000 when examining which model should be adopted for the application. The screen G4000 includes, for example, a model name G4005, a model image G007, meta information G4010, version information G4015, an outline G4020, model specifications G4025, an importance focus label G4030, an importance focus index G4040, an index G4050, and a new version registration button G4060.

The model name G4005 indicates the name of the model displayed on the model details screen G4000 and is information of, for example, the model name T3020 in the model table T3000.

The model image G4007 is an image expressing the image of the model and is displayed based on information of, for example, the image T3060 in the model table T3000.

The meta information G4010 is meta information of the relevant model and is information based on, for example, the meta information T3050 of the model table T3000. The relevant information includes, for example, the model developer's name (for example, the model developer's name acquired from a table which is not illustrated in the drawing, by using the developer identifier T3054 as a key), the category level 1 T3051 indicating the large category of the relevant model, the category level 2 T3052 indicating the medium category of the relevant model, and the category level 3 T3053 indicating the small category of the relevant model.

The version information G4015 indicates version information of the relevant model and is information of, for example, the version T3030 included in the model table T3000.

The outline G4020 is a text for explaining the outline of the relevant model and is information of, for example, the outline T3040 of the model table T3000.

The model specifications G4025: indicate information indicating, for example, in what kind of format the model is recorded in a file and what kind of inputs and how many inputs are received; and may be information of, for example, the model specifications T3058 included in the meta information T3050 of the model table T3000.

The importance focus label G4030 is information indicating on what kind of label the importance was focused when developing the relevant model. For example, if there are two types of labels, that is, bearing damage and coil damage as a failure mode label which becomes a target of diagnosis with respect to a model regarding which a failure predictor of a motor developed by using the machine learning technique is diagnosed, the importance focus label means on which label diagnosis accuracy the importance was focused when developing the model. Incidentally, the importance focus label G4030 may be information of, for example, the importance focus label T3055 included in the model table T3000.

The importance focus index G4040 is information indicating on what kind of index the importance was focused when developing the relevant model. The importance focus index indicates on which of the evaluation indexes such as "Accuracy," "Precision," "F-Value," and "Recall" the importance was focused. Regarding the model concerning which the failure predictor of the motor developed by using the machine learning technique is diagnosed, for example, if the importance focus index is "Recall," it is a model with few oversight of failures; and if the importance focus index is "Precision," it is a model regarding which the importance is focused on how small the number of false failure detections is. Incidentally, the importance focus index may be a value of descriptions such as "Accuracy" or may be any other information as long as it is information used to evaluate the model. The importance focus index G4040 may be information of, for example, the importance focus index T3056 included in the model table T3000.

The index G4050 visually indicates what kind of result the relevant model will have regarding the index such as "Accuracy." Incidentally, the index listed in the importance focus index G4040 may be highlighted. The application developer 1000 can select an appropriate model for the purpose of the application by means of the display.

The new version registration button G4060 is a button which is pressed when registering the model of a new version with respect to the relevant model.

Figure 17:
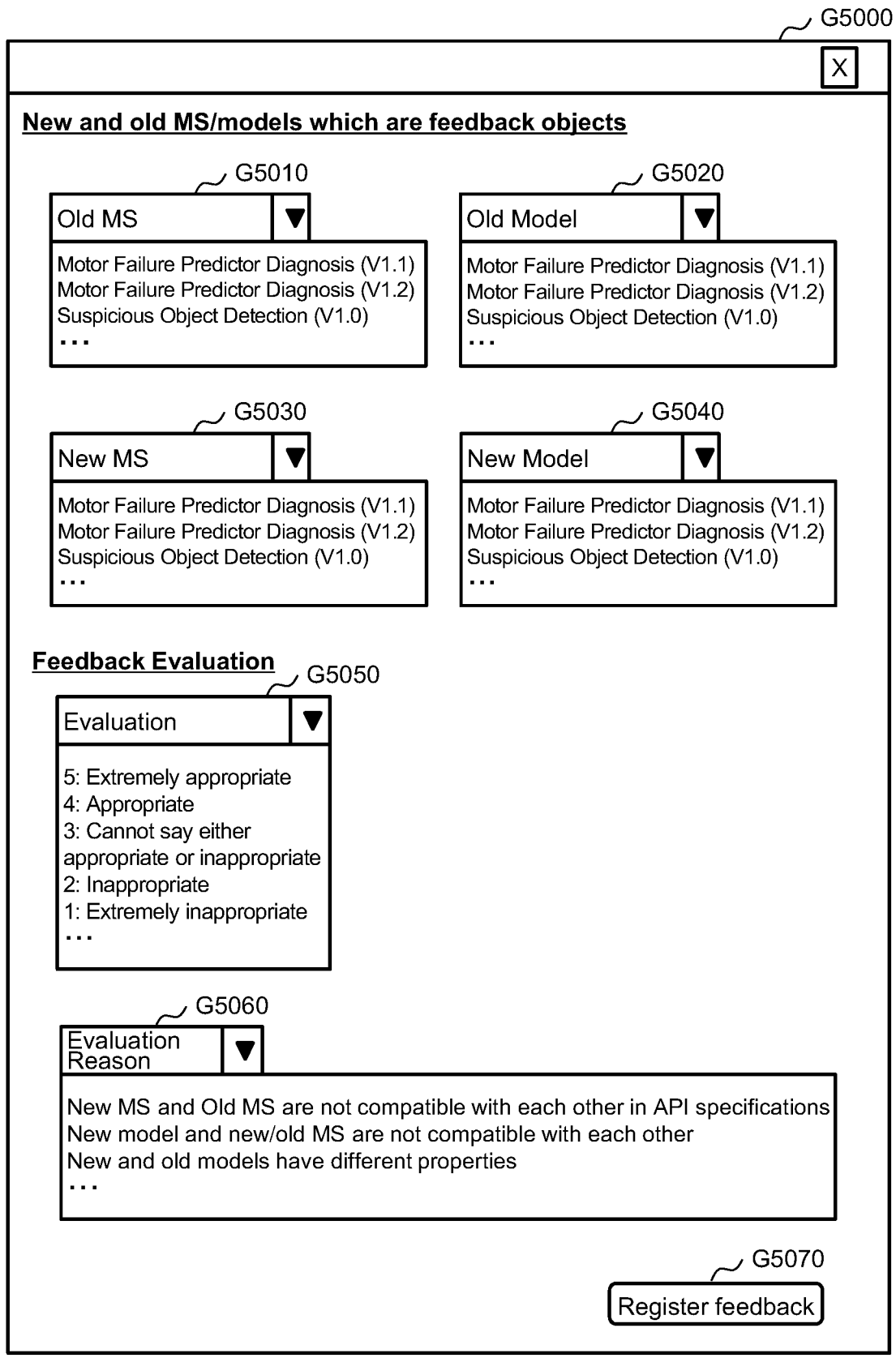
FIG. 17 is a diagram illustrating an implementation example of a feedback screen.

FIG. 17 is a diagram illustrating an implementation example of a feedback screen G5000.

The feedback screen G5000 is a screen used by the application developer 1000 to evaluate whether the candidate group evaluated and recommended by the evaluation program 3030 and the candidate recommendation program 3040 or displayed in the replacement candidate list G3030 on the MS details screen G3000 or the replacement candidate list G1030 on the application development screen G1000 is appropriate or not. The feedback screen G5000 includes an old MS G5010, an old model G5020, a new MS G5030, and a new model G5040 for designating pairs of new and old MS's and models which are targets of feedback, a feedback evaluation G5050, an evaluation reason G5060, and a feedback registration button G5070.

The old MS G5010, the old model G5020, the new MS G5030, and the new model G5040 are tools for designating the new and old MS/models which are the feedback evaluation targets. For example, the information of all the records of the MS table T2000 and the model table T3000 may be acquired and displayed as options. The user who performs the feedback selects the target from among the options.

Incidentally, when the transition is made from the MS details screen G3000 to the feedback screen G5000 without any operation by the user who performs the feedback evaluation, the screen may be set in a state where the old MS G5010, the old model G5020, the new MS G5030, and the new model G5040 are selected in advance, on the basis of the information of the identifier of the old MS/model and the identifier of the new MS/model of the replacement candidate which are displayed on the MS details screen G3000.

The feedback evaluation G5050 is a tool for inputting the evaluated value indicating whether or not the targeted new and old MS/models are appropriate as the replacement candidate. The evaluated value may be character strings such as "extremely inappropriate" and "appropriate" or a numeric value such as "1" to "5." Moreover, the evaluated value may be input not by a selection method, but by a method of manually inputting the number or the like. Other types of information for evaluating whether or not the targeted new and old MS/models are appropriate as the replacement candidate may be input.

The evaluation reason G5060 is a tool for inputting a reason for selecting the evaluated value. For example, the reason such as "New and old microservices are not compatible with each other in API specifications" or "New and old models have different properties."

The feedback registration button G5070 is a button for registering the feedback content in the marketplace system 3000. When this button is pressed, a new record is added to the feedback table T7000. Regarding each information of the added record, information of the evaluation source identifier T7020 is generated from the information of the old MS G5010 and the old model G5020 which are selected. Information of the evaluation destination identifier T7030 is generated from the new MS G5030 and the new model G5040. Information of the FB evaluated value T7040 and the evaluation reason T7050 is generated from the feedback evaluation G5050 and the evaluation reason G5060. The user identifier T7060 is generated from the identifier of the user who registered the feedback evaluation. The time stamp T7070 is acquired from the current time-of-day information. The reflected flag T7080 is set as "False."

The feedback table T7000 to which the record has been added is used to adjust the important weighting factor for the processing of the evaluation program 3030 for evaluating the replacement candidate of the appropriate MS and model. The weight adjustment is executed by the weight adjustment program 3060 regularly, for example, once every day (or irregularly). In the executed weight adjustment processing, the weight adjustment program 3060 firstly acquires a record whose the reflected flag T7080 is "False" from the feedback table T7000. The weight adjustment program 3060 acquires the FB evaluated value T7040 and the evaluation reason T7050 from the acquired record. Next, the weight adjustment program 3060: identifies which evaluation item of the plurality of evaluation items (labels) recorded in the weighting factor table T5000 applies to the information of the acquired evaluation reason T7050 (an example of information of at least part of the feedback information); and decides how to adjust the weighting factor corresponding to the identified evaluation item on the basis of the information of the evaluation reason T7050 (for example, to what degree the weighting factor should be increased or decreased). For example, if the information of the evaluation reason T7050 is "New MS and old MS are not compatible with each other in API specifications," the weight adjustment program 3060 identifies the MS API compatibility T5500 which has a high relevance with this reason. Moreover, since the information of the evaluation reason T7050 is "New MS and old MS are not compatible with each other in API specifications," it is determined that the influence degree of the weighting factor T5030 corresponding to the MS API compatibility T5500 may be low, and the weight adjustment program 3060 thereby decreases the value of the weighting factor T5030 corresponding to the MS API compatibility T5500. Accordingly, it is possible to lower the degree of influence by the MS API compatibility T5500 on the final evaluated value regarding the replacement candidate (the MS-model pair). Incidentally, to what degree the value of the weighting factor T5030 should be increased or decreased may be decided based on the FB evaluated value T7040 and may be, for example, −0.5 in a case of "inappropriate" or +0.5 in a case of "appropriate"; and any other decision may be made as long as the content of the user's feedback evaluation is reflected in the calculation of the evaluated value of the replacement candidate. Incidentally, regarding the record(s) included in the feedback table T7000, the weight adjustment program 3060 may change the reflected flag T7080 of the record used for the weighting factor adjustment processing from "False" to "True" in order to prevent the feedback content from being reflected doubly. Furthermore, the weighting factor adjustment processing may be conducted sequentially for each record included in the feedback table T7000 or may be conducted all at once in consideration of the FB evaluated value T7040 of the plurality of records.

According to the above-described embodiment, in the environment where the MS and the model are frequently updated, the application developer 1000 can promptly discover a new MS/model capable of replacing an MS/model included in the application without necessarily having to prepare a dataset for evaluating the MS or the model, and can thereby enhance the quality of the application with low load.

The aforementioned embodiment can be, for example, summarized as indicated below.

The replacement candidate recommendation system has the evaluation program 3030 (an example of an evaluation unit) and the candidate recommendation program 3040 (an example of a candidate recommendation unit). The evaluation program 3030 refers to at least one of: the MS table T2000 (an example of the MS information) including the meta information T2050 of the relevant MS with respect each of one or a plurality of MS's; and the model table T3000 (an example of the model information) including the meta information T3050 of the relevant model with respect to each of one or a plurality of models. Regarding each of one or two or more evaluation destination MS's/models for the relevant evaluation source MS/model with respect to each of one or two or more evaluation source MS's/models, the evaluation program 3030 calculates the evaluated value T4050 indicating the appropriateness as a replacement MS/model for the evaluation source MS/model on the basis of the meta information T2050/T3050 of the relevant evaluation destination MS/model and the meta information T2050/T3050 of the relevant evaluation source MS/model. Regarding each of the one or two or more evaluation source MS's/models, the one or two or more evaluation destination MS's/models for the relevant evaluation source MS/model may be all or some MS's/models other than the relevant evaluation source MS/model. The candidate recommendation program 3040 recommends one or more evaluation destination MS's/models, as a candidate for a replacement MS/model for a designated MS/model, to the application developer 1000 on the basis of the evaluated value T4050 of each of the one or two or more evaluation destination MS's/models regarding which the MS/model designated by the application developer 1000 (an example of the user) is the evaluation source MS/model. If the above-described replacement candidate recommendation system is employed, the application developer 1000 can promptly discover a new MS/model which can replace the MS/model included in the application without necessarily having to prepare a dataset for evaluating the MS/model and can thereby further enhance the quality of the application with low load.

The replacement candidate recommendation system may perform any one of the following: to calculate the evaluated value of the evaluation destination MS for the evaluation source MS; to calculate the evaluated value of the evaluation destination model for the evaluation source model; to recommend the replacement candidate MS on the basis of the evaluated value of the MS when the MS in the application is designated; and to recommend the replacement candidate model on the basis of the evaluated value of the model when the model in the application is designated; and the replacement candidate recommendation system may adopt the following configuration. Specifically speaking, at least one evaluation source MS/model may be an evaluation source MS model set. At least one evaluation destination MS/model may be an evaluation destination MS model set. Either MS model set of the evaluation source MS model set and the evaluation destination MS model set may be a set including an MS and one or more models included or used by the MS (that is, a model may be included in an MS, or exist outside the MS and used by the MS). Regarding each of one or two or more evaluation destination MS model sets of the relevant evaluation source MS model set with respect to each of one or two or more evaluation source MS model sets, the evaluation program 3030 may calculate the evaluated value T4050 indicating the appropriateness as a replacement MS model set for the relevant evaluation source MS model set on the basis of the meta information T2050 and T3050 of an MS and a model which are included in the relevant evaluation destination MS model set, and the meta information T2050 and T3050 of an MS and a model which are included in the relevant evaluation source MS model set. The designated MS/model in the application may be a designated MS model set. The designated MS model set may be a set of a designated MS in the application and one or more models included or used by the designated MS or a set of a designated model in the application and an MS using or including the designated model. If such a replacement candidate recommendation system is employed, it is possible to recommend an MS and a model included or used by the MS as a set even if MS's and models are managed separately as in the MS table T2000 and the model table T3000. This is considered to be useful because of the following point as an example. Specifically speaking, when a model is developed independently from MS's, it is possible to assume that the model is a general-purpose model which can use any one of two or more MS's; and in other words, the model which exists independently from the MS's can be singularly distributed. Therefore, it is possible to assume that each MS is singularly updated and each model is similarly updated. In this case, for example, if either one of a certain MS and a certain model used by that MS is updated, it is possible to assume that the updated MS cannot be always assured to be capable of using that certain model or the certain MS cannot be always assured to be capable of using the updated model. In the environment where such a case occurs, the replacement candidate recommendation system capable of evaluating and recommending the MS and the model as a set is useful.

Incidentally, with this system, regarding each of one or two or more evaluation destination MS model sets for the relevant evaluation source MS model set with respect to each of one or two or more evaluation source MS model sets, the evaluated value T4050 may be based on appropriateness $\omega$ (an example of first appropriateness), appropriateness $\varphi$ (an example of second appropriateness), and appropriateness $\theta$ (an example of third appropriateness). The appropriateness $\omega$ may be the appropriateness between the meta information T2050 of an evaluation source MS and the meta information T2050 of an evaluation destination MS. The appropriateness $\varphi$ may be the appropriateness between the meta information T3050 of an evaluation source model and the meta information T3050 of an evaluation destination model. The appropriateness $\theta$ may be the appropriateness between the meta information T2050 of the evaluation destination MS and the meta information T3050 of the evaluation destination model. According to this system, the evaluated value of the evaluation destination MS model set is based on the MS-model appropriateness at the evaluation destination other than the MS-MS appropriateness and the model-model appropriateness between the evaluation source and the evaluation destination. Therefore, it is expected that the evaluated value which is taken into consideration in order to recommend an MS and a model as a set is made an appropriate value. Incidentally, the evaluation source MS is an MS in the evaluation source MS model set. The evaluation destination MS is an MS in the evaluation destination MS model set. The evaluation source model is a model in the evaluation source MS model set. The evaluation destination model is a model in the evaluation destination MS model set.

As one configuration to evaluate and recommend a set of an MS and a model, the meta information T2050 of the MS may include the expected model specifications T2057 and the meta information T3050 of the model may include the actual model specifications T3058. The appropriateness $\theta$ may be based on the degree of coincidence between the expected model specifications T2057 of the evaluation destination MS and the actual model specifications T3058 of the evaluation destination model. Accordingly, the meta information T2050 of the MS and the meta information T3050 of the model include a common information item which is the model specifications, and the appropriateness $\theta$ is calculated based on the degree of coincidence between the mutual model specifications T2057 and T3058, so that it can be expected to enhance the appropriateness of the appropriateness $\theta$.

Meanwhile, in a case of evaluating and recommending an MS and a model respectively singularly in addition to the case of evaluating and recommending the MS and the model as a set, regarding each of one or two or more evaluation destination MS's/models for the relevant evaluation source MS/model with respect to each of one or two or more evaluation source MS's/models, the evaluated value T4050 may be based on at least one of the first appropriateness, the second appropriateness, and the third appropriateness. The first appropriateness may be based on one or more evaluated values $S_i$ respectively corresponding to one or more evaluation items that correspond to a specified one or more information items which are common between the meta information T2050 of the evaluation source MS and the meta information T2050 of the evaluation destination MS (regarding each of the relevant one or more evaluation items, the evaluated value may be based on the degree of coincidence of an information value of an information item corresponding to the relevant evaluation item). The second appropriateness may be based on one or more evaluated values $M_i$ respectively corresponding to one or more evaluation items that correspond to a specified one or more information items which are common between the meta information T3050 of the evaluation source model and the meta information T3050 of the evaluation destination model (regarding each of the relevant one or more evaluation items, the evaluated value may be based on the degree of coincidence of the information value of the information item corresponding to the relevant evaluation item). The third appropriateness may be based on one or more evaluated values respectively corresponding to one or more evaluation items that correspond to a specified one or more information items which are in common between the meta information T2050 of the evaluation destination MS and the meta information T3050 of the evaluation destination model (regarding each of the relevant one or more evaluation items, the evaluated value may be based on the degree of coincidence of the information value of the information item corresponding to the relevant evaluation item). According to this system, the appropriateness of the evaluated value T4050 can be expected to be enhanced.

A plurality of information items of the meta information T2050 of an MS may include a category to which the relevant MS belongs, and API specifications (an example of interface specifications) which are input-output specifications for the relevant MS. These can contribute to enhancement of appropriateness of the first appropriateness. Incidentally, examples of the information value of the category are the categories T2051 to T2053. An example of the information value of the API specifications is the API specifications T2055.

One or a plurality of information items of the meta information T3050 of a model may include model properties including a target on which the relevant model focuses importance (for example, at least one of a label and an index). This can contribute to the enhancement of the appropriateness of the second appropriateness. Incidentally, examples of the information value of the model properties are the importance focus label T3055, the importance focus index T3056, and the index T3057.

One or a plurality of information items of the meta information T2050 of an MS may include expected model specifications of a model included or used by the relevant MS. One or a plurality of information items of the meta information T3050 of a model may include information indicating actual model specifications of the relevant model. These can contribute to the enhancement of the appropriateness of the third appropriateness.

Regarding each of one or two or more evaluation destination MS's/models for the relevant evaluation source MS/model with respect to each of one or two or more evaluation source MS's/models, before evaluated values (for example, $S_i$ or $M_i$) of all the evaluation items are calculated (for example, every time the evaluated value is calculated), the evaluation program 3030 may judge whether or not the evaluated value $S_i$ or $M_i$ which has been calculated regarding the evaluation item is equal to or smaller than a pruning threshold value T5040 corresponding to the relevant evaluation item, among one or a plurality of pruning threshold values T5040 respectively corresponding to one or a plurality of evaluation items. If the result of the judgment is true, the evaluation program 3030 may set the evaluated value T4050 of the relevant evaluation destination MS/model as a minimum value (or a value meaning that the relevant evaluation destination MS/model cannot replace the relevant evaluation source MS/model) and terminate the evaluation of the relevant evaluation destination MS/model. Accordingly, the evaluation can be terminated early by identifying early that it is wasteful to continue evaluating the evaluation destination MS/model; and the evaluation of the next evaluation destination MS/model can be started early. As a result, time required for the evaluation can be shortened as a whole. Incidentally, when the importance degree of the evaluation item is higher, the pruning threshold value may become high. Consequently, it is possible to identify efficiently that it is wasteful to continue evaluating the evaluation destination MS/model. The evaluated values of the evaluation items may be calculated in descending order of the importance degree of the evaluation items.

Regarding each of one or two or more evaluation destination MS's/models for the relevant evaluation source MS/model with respect to each of one or two or more evaluation source MS's/models, if one or a plurality of information items of the meta information T2050 of an MS includes a version of the relevant MS, an evaluated value $S_i$ regarding the evaluation item T5506 corresponding to the version may be based on which one of the following applies, that is, the relevant evaluation destination MS is a direct descendant of the relevant evaluation source MS, the relevant evaluation destination MS is a collateral descendant of the relevant evaluation source MS, and the relevant evaluation destination MS is not a descendant of the relevant evaluation source MS. Similarly, if one or a plurality of information items of the meta information T3050 of a model includes a version of the relevant model, the evaluated value $M_i$ regarding the evaluation item T5506 corresponding to the version may be based on which one of the following applies, that is the relevant evaluation destination model is a direction descendant of the relevant evaluation source model, the relevant evaluation destination model is a collateral descendant of the relevant evaluation source model, and the relevant evaluation destination model is not a descendant of the relevant evaluation source model. Consequently, the appropriateness of the first appropriateness or the second appropriateness which is calculated based on the above-described evaluated value can be expected to be enhanced.

Regarding each of one or two or more evaluation destination MS's/models for the relevant evaluation source MS/model with respect to each of one or two or more evaluation source MS's/models, an evaluated value regarding an evaluation item may be based on a sub-evaluated value regarding the relevant evaluation item and a weighting factor T5030 corresponding to the relevant evaluation item among a plurality of weighting factors T5030 respectively corresponding to a plurality of evaluation items. The sub-evaluated value regarding the evaluation item may be based on a degree of coincidence between the relevant evaluation source MS/model and the relevant evaluation destination MS/model for an information value of an information item corresponding to the relevant evaluation item. Each of the plurality of weighting factors T5030 may represent the weight of the evaluation item corresponding to the relevant weighting factor. Consequently, the appropriateness of the evaluated value regarding the evaluation item can be expected to be enhanced.

The replacement candidate recommendation system may have the weight adjustment program 3060 (an example of a weight adjustment unit). When there is feedback information that is information indicating feedback of the relevant evaluation result regarding an evaluation result which is a result of the evaluation of the evaluation destination MS/model for the evaluation source MS/model, the weight adjustment program 3060 may adjust at least one of the plurality of weighting factors T5030 on the basis of the relevant feedback information. Specifically speaking, the feedback information may include an FB evaluated value T7040 indicating an evaluated value indicating appropriateness of the evaluation result, and evaluation reason T7050 indicating a reason for the relevant FB evaluated value T7040 (the evaluation reason T7050 may include information indicating a reason regarding at least one evaluation item). Regarding the evaluation result with the feedback information, the weight adjustment program 3060 may identify an evaluation item on the basis of the evaluation reason T7050 of the relevant feedback information. The weight adjustment program 3060 may decide how a weighting factor of the identified evaluation item should be adjusted, on the basis of the FB evaluated value T7040 and the evaluation reason T7050 of the feedback information. For example, an evaluation item with a high matching degree with a text indicating the reason included by the evaluation reason T7050 may be identified as the evaluation item corresponding to the adjustment target weighting factor. Furthermore, whether the weighting factor T5030 corresponding to the identified evaluation item should be made larger or smaller and to what degree the weighting factor T5030 corresponding to the identified evaluation item should be made larger or smaller may be decided on the basis of whether the reason included in the evaluation reason T7050 is affirmative or negative, and the FB evaluated value T7040. Consequently, it is expected to maintain each weighting factor to be optimum and, therefore, the appropriateness of the evaluated value obtained regarding each evaluation item can be expected to be enhanced.

When there is a test dataset managed by the application developer 1000 regarding at least one of one or two or more evaluation destination MS's/models regarding which the designated MS/model is an evaluation source MS/model, the candidate recommendation program 3040 may perform a test of the relevant evaluation destination MS/model by using the above-mentioned test dataset and cause the evaluated value T7040 of the relevant evaluation destination MS/model to be an evaluated value in accordance with an evaluation of the result of the test. Consequently, the appropriateness of the evaluated value of the evaluation source MS/model can be expected to be enhanced.

REFERENCE SIGNS LIST

1000: application developer
1010: MS developer
1020: model developer
3000: marketplace system
3030: evaluation program
3040: candidate recommendation program

The invention claimed is:

1. A system for deploying an application that improves performance of the application, the system comprising:
a memory; and
one or more processors that are communicatively coupled to the memory,
wherein the one or more processors are collectively configured to:
store, in the memory, at least one of microservice information including meta information of a relevant microservice with respect to each of one or a plurality of microservices and model information including meta information of a relevant model with respect to each of one and a plurality of service/models,
perform an evaluation, regarding each of one or two or more evaluation destination services/models for a relevant evaluation source service/model with regard to each of one or two or more evaluation source services/models, appropriateness as a replacement service/model for an application based on meta information of an evaluation destination service/model and meta information of an evaluation source service/model, wherein regarding each of the one or two or more evaluation source services/models, the one or two or more evaluation destination services/models for the evaluation source service/model are all or some services/models other than the evaluation source service/model; and
select, one or more evaluation destination services/models as a candidate for the replacement service/model based on the evaluation,
form an updated application by replacing the candidate with a new service/model from the plurality of service/models stored in the memory, and
deploy the updated application.

2. The system according to claim 1,
wherein at least one evaluation source service/model is an evaluation source service model set;
wherein at least one evaluation destination service/model is an evaluation destination service model set;
wherein either service model set of the evaluation source service model set and the evaluation destination service model set is a set including a microservice and one or more models included or used by the microservice;
wherein the one or more processors are further collectively configured to
evaluate, regarding each of one or two or more evaluation destination service model sets of a relevant evaluation source service model set with respect to each of one or two or more evaluation source service model sets, appropriateness as a replacement service model set for the evaluation source service model set based on respective meta information of a respective microservice and a model which are included in the evaluation destination service model set, and respective meta information of the respective microservice and a model included in the evaluation source service model set.

3. The system according to claim 2,
wherein regarding each of the one or two or more evaluation destination service model sets of the relevant evaluation source service model set with respect to each of the one or two or more evaluation source service model sets,
the evaluation is based on a first appropriateness, a second appropriateness, and a third appropriateness;
the first appropriateness is appropriateness between meta information of an evaluation source microservice and meta information of an evaluation destination microservice;
the second appropriateness is appropriateness between meta information of an evaluation source model and meta information of an evaluation destination model;

the third appropriateness is appropriateness between the meta information of the evaluation destination microservice and the meta information of the evaluation destination model;

the evaluation source microservice is the microservice in an evaluation source service model set;

the evaluation destination microservice is the microservice in an evaluation destination service model set;

the evaluation source model is a model in the evaluation source service model set; and the evaluation destination model is a model in the evaluation destination service model set.

4. The system according to claim 3, wherein the meta information of the microservice includes information indicating expected model specifications of a model included or used by the microservice;

wherein the meta information of the model includes information indicating actual model specifications of the model; and wherein the third appropriateness is based on a degree of coincidence between an expected model specifications indicated by the meta information of the evaluation destination microservice and an actual model specifications indicated by the meta information of the evaluation destination model.

5. The system according to claim 1, wherein regarding each of the one or two or more evaluation destination services/models for the evaluation source service/model with respect to each of the one or two or more evaluation source services/models, the evaluation is based on at least one of a first appropriateness, a second appropriateness, and a third appropriateness;

the first appropriateness is based on one or more evaluated values respectively corresponding to one or more evaluation items corresponding to a specified one or more information items which are in common between the meta information of an evaluation source microservice and the meta information of an evaluation destination microservice;

the second appropriateness is based on one or more evaluated values respectively corresponding to one or more evaluation items corresponding to a specified one or more information items which are in common between the meta information of the evaluation source model and the meta information of the evaluation destination model; and the third appropriateness is based on one or more evaluated values respectively corresponding to one or more evaluation items corresponding to a specified one or more information items which are in common between the meta information of the evaluation destination microservice and the meta information of the evaluation destination model.

6. The system according to claim 5, wherein a plurality of information items for meta information of a microservice include a category to which the microservice belongs, and interface specifications which are input-output specifications for the microservice.

7. The system according to claim 5, wherein one or a plurality of information items for meta information of a microservice include expected model specifications of a model included or used by the microservice; and wherein one or a plurality of information items for meta information of a model includes information indicating actual model specifications of the model.

8. The system according to claim 5, wherein regarding each of the one or two or more evaluation destination services/models for the evaluation source service/model with respect to each of the one or two or more evaluation source services/models, the one or more processors are further collectively configured to:

perform a judgment of whether or not a calculated value for an evaluation item is equal to or smaller than a pruning threshold value corresponding to a relevant evaluation item among one or a plurality of pruning threshold values respectively corresponding to one or a plurality of evaluation items, before evaluated values of all the evaluation items are calculate; and when a result of the judgment is true, sets the evaluated value of the evaluation destination service/model as a minimum value or a value which means that the evaluation destination service/model cannot replace the evaluation source service/model, and terminates the evaluation of the evaluation destination service/model.

9. The system according to claim 5, wherein regarding each of the one or two or more evaluation destination services/models for the evaluation source service/model with respect to each of the one or two or more evaluation source services/models, when one or a plurality of information items of meta information of a microservice include a version of the microservice, an evaluated value regarding an evaluation item corresponding to the version is based whether the evaluation destination microservice is a direct descendant of the evaluation source microservice, is a collateral descendant of the evaluation source microservice, or is not a descendant of the evaluation source microservice; and when one or a plurality of information items of meta information of a model include a version of the model, an evaluated value regarding an evaluation item corresponding to the version is based on whether the evaluation destination model is a direct descendant of the evaluation source model, is a collateral descendant of the evaluation source model, or is not a descendant of the evaluation source model.

10. The system according to claim 5, wherein regarding each of the one or two or more evaluation destination services/models for the evaluation source service/model with respect to each of the one or two or more evaluation source services/models, an evaluated value regarding an evaluation item is based on a sub-evaluated value regarding the evaluation item and a weighting factor corresponding to the evaluation item among a plurality of weighting factors respectively corresponding to a plurality of evaluation items;

the sub-evaluated value regarding the evaluation item is based on a degree of coincidence between the evaluation source service/model and the evaluation destination service/model regarding an information value of an information item corresponding to the evaluation item; and each of the plurality of weighting factors represents a weight of an evaluation item corresponding to the weighting factor.

11. The system according to claim 10, wherein the one or more processors are further collectively configured to:

when there is feedback information that is information indicating feedback of an evaluation result which is a result of the evaluation of the evaluation destination service/model for the evaluation source service/model, adjust at least one of the plurality of weighting factors based on the feedback information, wherein the feedback information includes information indicating a feedback evaluation which is an evaluation indicating appropriateness of the evaluation result, and information indicating an evaluation reason which is a reason for the feedback evaluation and the evaluation reason includes a reason for at least one evaluation item; and identify an evaluation item based on the evaluation reason indicated by the feedback information; and decide how a weighting factor of the identified evaluation item should be adjusted, based on the feedback evaluation and the evaluation reason indicated by the feedback information.

12. The system according to claim 1, wherein when there is a test dataset managed by a user with respect to at least one of one or two or more evaluation destination services/models, regarding which a designated service/model is an evaluation source service/model, wherein the one or more processors are further collectively configured to:

perform a test of the evaluation destination service/model by using the test dataset and causes the evaluation of the evaluation destination service/model to be an evaluation in accordance with an evaluation of a result of the test.

13. A method for deploying an application that improves performance of the application, the method comprising:

storing at least one of microservice information including meta information of a relevant microservice with respect to each of one or a plurality of microservices and model information including meta information of a relevant model with respect to each of one and a plurality of service/models;

performing an evaluation regarding each of one or two or more evaluation destination services/models for a relevant evaluation source service/model with regard to each of one or two or more evaluation source services/models, appropriateness as a replacement service/model for an evaluation source service/model based on the meta information of an evaluation destination service/model and meta information of the evaluation source service/mode, wherein regarding each of the one or two or more evaluation source services/models, the one or two or more evaluation destination services/models for the evaluation source service/model are all or some services/models other than the evaluation source service/model;

selecting, one or more evaluation destination services/models as a candidate for a replacement service/model based on the evaluation forming an updated application by replacing the candidate with a new service/model from the plurality of service/models stored, and deploying the updated application.

* * * * *